United States Patent
Okada et al.

(10) Patent No.: US 10,543,562 B2
(45) Date of Patent: Jan. 28, 2020

(54) OVERLAP-WELDED MEMBER, AUTOMOBILE PART, METHOD OF WELDING OVERLAPPED PORTION, AND METHOD OF MANUFACTURING OVERLAP-WELDED MEMBER

(71) Applicant: NIPPON STEEL CORPORATION, Tokyo (JP)

(72) Inventors: Tohru Okada, Tokyo (JP); Hideki Ueda, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 665 days.

(21) Appl. No.: 14/418,403

(22) PCT Filed: Aug. 12, 2013

(86) PCT No.: PCT/JP2013/071841
§ 371 (c)(1),
(2) Date: Jan. 29, 2015

(87) PCT Pub. No.: WO2014/025063
PCT Pub. Date: Feb. 13, 2014

(65) Prior Publication Data
US 2015/0217396 A1 Aug. 6, 2015

(30) Foreign Application Priority Data

Aug. 10, 2012 (JP) .................................. 2012-178691

(51) Int. Cl.
*B23K 11/16* (2006.01)
*B23K 11/11* (2006.01)
(Continued)

(52) U.S. Cl.
CPC ............... *B23K 11/16* (2013.01); *B23K 11/11* (2013.01); *C21D 6/00* (2013.01); *C21D 9/0068* (2013.01); *C22C 38/00* (2013.01); *Y10T 403/478* (2015.01)

(58) Field of Classification Search
CPC ... B23K 11/115; B23K 2201/18; B23K 11/16; B23K 11/11
(Continued)

(56) References Cited

U.S. PATENT DOCUMENTS

2012/0129006 A1    5/2012  Kanai et al.
2012/0141829 A1*   6/2012  Oikawa ................. B23K 11/115
                                                        428/683

FOREIGN PATENT DOCUMENTS

DE    10 2011 113 267 A1    4/2012
JP       2002-103054 A       4/2002
(Continued)

OTHER PUBLICATIONS

Japanese Notice of Allowance, dated Feb. 10, 2015, for Japanese Application No. 2014-529593 with English translation.
(Continued)

*Primary Examiner* — Weiping Zhu
(74) *Attorney, Agent, or Firm* — Birch, Stewart, Kolasch & Birch, LLP

(57) ABSTRACT

The present invention provides an overlap-welded member in which an overlapped portion including plural steel sheet members is joined at a spot-welded portion, in which at least one of the plural steel sheet members contains martensite, and the spot-welded portion includes: a nugget formed through spot welding; a heat-affected zone formed in the vicinity of the nugget; the softest zone having the lowest Vickers hardness in the heat-affected zone; and a tempered area formed between a central portion of the nugget and the softest zone and made out of tempered martensite having Vickers hardness of not more than 120% in the case where Vickers hardness of the softest zone is 100%.

7 Claims, 18 Drawing Sheets

(51) Int. Cl.
*C21D 6/00* (2006.01)
*C21D 9/00* (2006.01)
*C22C 38/00* (2006.01)

(58) Field of Classification Search
USPC .......................................................... 148/526
See application file for complete search history.

(56) References Cited

FOREIGN PATENT DOCUMENTS

| | | | |
|---|---|---|---|
| JP | 2008-229720 A | | 10/2008 |
| JP | 2008229720 A | * | 10/2008 |
| JP | 2009-697 A | | 1/2009 |
| JP | 2009-1839 A | | 1/2009 |
| JP | 2010-115706 A | | 5/2010 |
| JP | 2012-187617 A | | 10/2012 |
| WO | WO 2011/013793 A1 | | 2/2011 |
| WO | WO 2011/025015 A1 | | 3/2011 |

OTHER PUBLICATIONS

International Search Report, dated Oct. 15, 2013, issued in PCT/JP2013/071841.
Masatoshi Shinozaki et al., "Improvement in Fatigue Strength of Spot Welded High Strength Sheet Steel Joints", vol. 68, No. 9, (1982), pp. 1444-1451.
Written Opinion of the International Searching Authority, dated Oct. 15, 2013, issued in PCT/JP2013/071841.

* cited by examiner

OVERLAP-WELDED MEMBER, AUTOMOBILE PART, METHOD OF WELDING OVERLAPPED PORTION, AND METHOD OF MANUFACTURING OVERLAP-WELDED MEMBER

TECHNICAL FIELD

The present invention relates to an overlap-welded member obtained by joining an overlapped portion including plural steel sheet members at a spot-welded portion, an automobile part including the overlap-welded member, a method of welding the overlapped portion, and a method of manufacturing the overlap-welded member.

The present application claims priority based on Japanese Patent Application No. 2012-178691 filed in Japan on Aug. 10, 2012, the contents of which are incorporated herein by reference.

BACKGROUND ART

In recent years, in the automobile field, high-tensile steel sheets have been increasingly used in order to reduce the weight of a vehicle and improve safety against collision.

Furthermore, the level of strength of high-tensile steel sheets has increased year by year, and for example, hot-stamped members having tensile strength of 1500 MPa or higher have been practically used. The hot-stamped member as used herein is a member obtained by applying press working in a state where a steel sheet is heated to approximately 900° C. to be softened, and at the same time, quenching and strengthening the steel sheet using a cooling effect (contact cooling) due to contact with a die, thereby achieving the tensile strength of a 1500 MPa class as described above and favorable dimensional accuracy.

Furthermore, for example, in the case of assembling a vehicle body, a resistance spot welding is frequently used in which two or more steel sheet members formed by steel sheets are overlapped, and energization is applied while pressure is being applied with electrodes.

With this resistance spot welding, a melted and solidified portion having an ellipse shape, in other words, a nugget is formed in the overlapped portion through energization and heating, whereby it is possible to join the plural steel sheet members.

For example, FIG. 1 is a diagram schematically illustrating distribution of hardness in a spot-welded portion 10 in the case where conventional energization conditions are applied to two transformation-induced plasticity (TRIP) members S11 and S12.

More specifically, (a) in FIG. 1 is a sectional view schematically illustrating the vicinity of the spot-welded portion 10 in which the vertical direction on the paper is set to the thickness direction (in other words, a direction in which pressure is applied with the electrodes) of the TRIP members S11 and S12. Note that, in the following descriptions in the specification of the present application, a diagram illustrating a cross-section of two overlapped members when viewed in a similar manner to that in (a) in FIG. 1 is also referred to as a "sectional view illustrating a/the spot-welded portion."

Furthermore, (b) in FIG. 1 is a graph schematically illustrating distribution of Vickers hardness so as to correspond to (a) in FIG. 1.

A molten metal generated through resistance spot welding is cooled at a high cooling rate, and hence, martensite is more likely to form in a nugget 12. As a result, the nugget 12 has a structure harder than a base metal portion. Note that, in the case where the strength of the base metal is high, the carbon equivalent is generally high, so that Vickers hardness of the nugget is high.

As illustrated in FIG. 1, the spot-welded portion 10 includes the nugget 12 and a HAZ 14. The HAZ 14 includes a HAZ hardened portion 14H located close to the nugget 12, and a HAZ softening zone 14T formed in the vicinity of the HAZ hardened portion 14H. Furthermore, the softest zone 14L in HAZ exists at an inner peripheral edge of the HAZ softening zone 14T.

The quality of the spot-welded portion is often evaluated on the basis of a tensile shear strength and a cross-tension strength (the strength of joint in a peel direction), and it is known that the tensile shear strength increases with an increase in the strength of the base metal.

However, in the case where the base metal has a tensile strength higher than a 780 MPa class, the peel strength, typified by the cross-tension strength, tends to decrease with an increase in strength of the base metal.

Below, a cross-tension test based on JIS Z3137 (1999), which is designed for measuring the cross-tension strength, will be schematically described with reference to FIG. 2A.

As illustrated in FIG. 2A, in the cross-tension test, two test pieces S21 and S22 formed by steel sheets are orthogonally arranged, and are joined by forming the spot-welded portion 10 including the nugget 12 through resistance spot welding.

Then, the test pieces S21 and S22 are pulled in a direction in which they are peeled, and the peel strength is measured until the spot-welded portion 10 is fractured.

A fracture mode with the cross-tension test can be divided into the following:
(a) interface fracture in which an interface between sheets in the nugget fractures;
(b) partial plug fracture in which, as illustrated in FIG. 2B, a crack propagates within the nugget 12 (inner side than a nugget end 12E) and then, fracture advances in the thickness direction; and
(c) plug fracture in which, as illustrated in FIG. 2C, the nugget 12 does not break, and the outer peripheral portion of the nugget 12 fractures in the thickness direction.

FIG. 2D is a diagram illustrating an example of a correlation between a base metal tensile strength and a cross-tension strength.

In FIG. 2D, "black dots" represent the plug fracture, and "blank circles" represent the partial plug fracture.

As illustrated in FIG. 2D, the cross-tension strength is approximately 9 kN in the case of a hot-stamped member of a 1500 MPa class (a steel sheet member obtained by hot-stamping a steel sheet for hot-stamping whose tensile strength becomes a 1500 MPa class by being hot-stamped), and is approximately 4 kN in the case of a hot-stamping member of an 1800 MPa class (a steel sheet member obtained by hot-stamping a steel sheet for hot-stamping whose tensile strength becomes an 1800 MPa class by being hot-stamped).

On the other hand, the cross-tension strength of a high-strength steel sheet of a 980 MPa class or lower falls in the range of approximately 8 kN to 14 kN.

In other words, the cross-tension strength of the hot-stamped member of a 1500 MPa class or higher is significantly lower than that of the high-strength steel sheet of 980 MPa class or lower.

Furthermore, as for the fracture mode through the cross-tension test, the high-strength steel sheet of a 980 MPa class or lower is fractured mainly in relation to the plug fracture in which the outside of the nugget 12 fractures, whereas the hot-stamp member of a 1500 MPa class or the hot-stamped member of an 1800 MPa class is fractured mainly in relation to the partial plug fracture.

This shows that, in the case of the hot-stamped member of a 1500 MPa class or higher, a crack is more likely to occur in the nugget because the toughness is small in the nugget.

As described above, in the case of the spot welding of the high-strength steel sheet, it is considered that the peel strength reduces mainly because the toughness reduces with an increase in hardness of the nugget, and thus, fracture (partial plug fracture) is more likely to occur in the nugget.

In general, with an increase in the diameter of the nugget, the fracture mode is more likely to be the plug fracture rather than the partial plug fracture, and the strength of the spot-welded portion increases.

Thus, in order to improve the peel strength of the spot-welded portion of the high-tensile steel sheet, it is effective, for example, to increase the diameter of the nugget.

However, in the case where the high-tensile steel sheet is subjected to resistance spot welding, spattering of molten steel called splash is more likely to occur as compared with a case where mild steel is subjected to resistance spot welding, possibly making it difficult to increase the diameter of the nugget.

In order to suppress the occurrence of splash, it is effective, for example, to increase the compression force with the electrodes. However, there is a restriction resulting from equipment such as a limitation of a welding gun in terms of stiffness.

Furthermore, it can be considered that, by increasing the number of spots in spot welding, it is possible to reduce the load stress per spot in spot welding. However, deterioration in productivity is inevitable.

Furthermore, if the distance between spots in spot welding is reduced, electric current is diverted to the spot-welded portions that have been already formed, causing a problem in which nuggets cannot be formed in a stable manner.

In other words, a desirable technique is one that can improve the strength of an overlap-welded member with resistance spot welding without changing the diameter of the nugget from the conventional one.

As for the technique described above, a subsequent energization method is disclosed in which a nugget is formed with main energization, and after the nugget is cooled, energization is performed again (see, for example, Non-Patent Document 1).

With the subsequent energization method, as illustrated, for example, in FIG. 3, in a state where a predetermined compression force is applied with electrodes in resistance spot welding, (A) a nugget is formed by applying first energization (main energization) under conventional normal conditions;
(B) a predetermined suspension time is set to cool until martensite is formed in the vicinity of the nugget; and
(C) second energization (subsequent energization) is applied, thereby tempering the martensite.

With the subsequent energization method as described above, each heat-affected zone (hereinafter, referred to as a HAZ) of the nugget and the spot-welded portion is tempered, whereby toughness is improved. Furthermore, the HAZ is softened and is easily deformed, whereby stress in a nugget end portion area is alleviated at the time of peeling. Thus, it is considered that the peel strength can be improved.

With the resistance spot welding employing the subsequent energization, after the nugget is formed through the main energization, the molten metal is rapidly cooled through an Ms point to an Mf point or lower, and martensite is formed.

The martensite thus formed becomes tempered martensite by controlling the electric current conditions and the like used in the subsequent energization to adjust a heat-inputted amount so as to raise temperatures to fall in an appropriate temperature range (in other words, not less than approximately 550 to 600° C. and not more than an Ac1 point as illustrated in FIG. 3) in which tempering is possible, and being cooled after the subsequent energization is completed.

FIG. 4 is a diagram schematically illustrating distribution of hardness in a spot-welded portion 10 after the spot-welded portion 10 is formed by overlapping test pieces S31 and S32, which are dual phase (DP) members or TRIP members, under normal conditions used in the conventional resistance spot welding illustrated in FIG. 3, and applying the subsequent energization.

More specifically, (a) in FIG. 4 is a sectional view illustrating a spot-welded portion, and (b) in FIG. 4 is a graph schematically showing distribution of Vickers hardness in which each position corresponds to that in (a) in FIG. 4.

In the case where the overlapped portion is welded through resistance spot welding using the subsequent energization as illustrated in FIG. 3, the spot-welded portion 10 is first formed through main energization.

At this point in time, as illustrated in (b) in FIG. 1, the spot-welded portion 10 includes the nugget 12 and the HAZ 14, and the HAZ 14 includes a HAZ hardened portion 14H proximate to the nugget 12, and a HAZ softening zone 14T formed in the vicinity of the HAZ hardened portion 14H. Furthermore, the softest zone 14L in HAZ exists at an inner peripheral edge of the HAZ softening zone 14T.

Then, by applying the subsequent energization to the spot-welded portion 10, the nugget 12 and the HAZ hardened portion 14H are tempered as illustrated in FIG. 4, and the hardness of the nugget 12 and the HAZ hardened portion 14H is decreased.

However, hard portions 14P locally remain in the HAZ hardened portion 14H. Thus, at the time of peeling, the hard portions in the HAZ 14 are not deformed, and deformation concentrates on the vicinity of the nugget end 12E. As a result, stress concentration on the nugget end 12E is not sufficiently improved.

Furthermore, FIG. 5 is a diagram schematically illustrating changes of a HAZ 14 in a spot-welded portion 10 in the case where resistance spot welding according to conventional normal conditions is applied to test pieces S41 and S42, which are hot-stamped member, to form the spot-welded portion 10, and the spot-welded portion 10 is subjected to subsequent energization.

More specifically, (a) in FIG. 5 is a sectional view illustrating a spot-welded portion including the nugget 12 formed through single energization applied to the test pieces S41 and S42, and (b) in FIG. 5 is a graph schematically showing distribution of Vickers hardness in which each position corresponds to that in (a) in FIG. 5.

Furthermore, (c) in FIG. 5 is a sectional view illustrating a spot-welded portion including the nugget 12 after the subsequent energization, and (d) in FIG. 5 is a graph schematically showing distribution of Vickers hardness in which each position corresponds to that in (c) in FIG. 5.

It should be noted that the long dashed double-short dashed line illustrated in (d) in FIG. 5 illustrates the distribution of Vickers hardness after the main energization and before the subsequent energization.

In the case where the subsequent energization is performed under appropriate conditions, a large area including the nugget 12 and the HAZ hardened portion 14H is tempered as illustrated in (d) in FIG. 5. However, tempering cannot be sufficiently performed between the nugget end 12E and the softest zone 14L in HAZ, and portions 14P having high Vickers hardness locally remain.

In other words, an effect of improving toughness through tempering cannot be sufficiently obtained, and hence, it is not easy to sufficiently secure peel strength of the spot-welded portion 10.

Furthermore, in the case where heat inputted is excessive during the subsequent energization, the HAZ hardened portion 14H is tempered. However, the nugget 12 is quenched again. Thus, although the HAZ hardened portion 14H is tempered, the nugget 12 is quenched again, and hence the nugget 12 becomes hardened.

As a result, the toughness of the nugget 12 is deteriorated, and the peel strength of the spot-welded portion 10 is reduced.

As described above, with the conventional subsequent energization method, it is not easy to sufficiently obtain the effect of improving the toughness of the spot-welded portion, and there is a problem in which welding time increases, which leads to a notion that this conventional subsequent energization method is not practical. In order to solve these problems, various techniques have been disclosed.

Patent Document 1 discloses an invention in which conditions for subsequent energization are determined according to sheet sets through numerical calculation.

Patent Document 2 discloses an invention in which subsequent energization is applied at least once for a short period of time under high electric current conditions to effectively heat a portion that is to be a starting point of fracture, thereby reducing the welding time, and furthermore, the invention has a wide range of appropriate conditions.

Patent Document 3 discloses an invention that improves the fracture strength of the joined portion by increasing the width of the HAZ softening zone in the vicinity of the nugget through subsequent energization, and making the structure fine while maintaining the hardness of the nugget.

Patent Document 4 discloses an invention related to spot welding that can secure excellent tensile strength when applied to a high-tensile steel sheet, by forming the maximum point of hardness in a HAZ portion while maintaining the hardness of a nugget through spot welding with a simple two-step energization type formed by combining main energization and tempering energization.

RELATED ART DOCUMENTS

Patent Document

Patent Document 1: Japanese Unexamined Patent Application, First Publication No. 2002-103054
Patent Document 2: Japanese Unexamined Patent Application, First Publication No. 2010-115706
Patent Document 3: Japanese Unexamined Patent Application, First Publication No. 2012-187617
Patent Document 4: Japanese Unexamined Patent Application, First Publication No. 2008-229720

Non-Patent Document

Non-Patent Document 1: "Tetsu-to-Hagane" Vol. 68, No. 9, P1444-1451

DISCLOSURE OF THE INVENTION

Problems to be Solved by the Invention

According to the technique disclosed in Patent Document 1, an object thereof is to improve peel strength and fatigue strength of the spot-welded portion, and it is possible to optimize conditions for subsequent energization. However, the effect obtained therefrom is limited because this technique utilizes residual stress.

According to the technique disclosed in Patent Document 2, it is possible to soften the nugget and the hardened portion of the HAZ serving as a fracture starting point to improve the toughness, by optimizing subsequent energization after welding.

However, it does not specifically indicate the state of softness. Furthermore, although the cross-tension strength is improved, the mechanism thereof is not clear, and the peel strength is not necessarily sufficiently improved.

According to the technique disclosed in Patent Document 3, although it argues that the fracture strength can be improved by increasing the width of the HAZ portion, the position of HAZ softening, rather than the width of the HAZ portion, is more important to alleviate strain concentration as will be described later, and hence, there is a possibility that the strain concentration on the nugget end portion cannot be sufficiently alleviated.

According to the technique disclosed in Patent Document 4, excellent tensile strength is obtained by changing the distribution of the hardened portion in the HAZ portion. However, this technique improves the strength of a joint by distributing the strain concentrated on the HAZ portion. Thus, there is a possibility that an effect is less likely to be obtained in the case where fracture occurs within the nugget.

Furthermore, the techniques disclosed in Patent Documents 3 and 4 are techniques by which the effects cannot be obtained, for example, in the case of hot-stamped members of a 1500 MPa class or higher, to which the present invention is directed.

As described above, in the case of the high-strength steel sheet including martensite, it is difficult to improve the peel strength of the spot-welded portion through subsequent energization, and effective subsequent energization methods are desired. Furthermore, in place of the subsequent energization having poor productivity because of longer welding time, there has been a demand for a technique that can improve the peel strength of the spot-welded portion through single energization.

The present invention has been made in view of the situations as described above, and an object of the present invention is to provide an overlap-welded member, an automobile part including the overlap-welded member, a method of welding an overlapped portion, and a method of manufacturing the overlap-welded member, which can improve the peel strength of the spot-welded portion.

Means for Solving the Problem

Each aspect of the present invention is as follows:
(1) A first aspect of the present invention provides an overlap-welded member in which an overlapped portion including plural steel sheet members is joined at a spot-welded portion, in which at least one of the plural steel sheet members contains martensite; and the spot-welded portion includes: a nugget formed through spot welding; a heat-affected zone formed in the vicinity of the nugget; a softest zone having the lowest Vickers hardness in the heat-affected zone; and a tempered area formed between a central portion of the nugget and the softest zone and made out of tempered martensite having Vickers hardness of not more than 120% in a case where Vickers hardness of the softest zone is 100%.

(2) A second aspect of the present invention provides an overlap-welded member in which an overlapped portion including plural steel sheet members is joined at a spot-welded portion, in which at least one of the plural steel sheet members contains martensite; the spot-welded portion includes a nugget formed through resistance spot welding a heat-affected zone formed in the vicinity of the nugget, and a softest zone having the lowest Vickers hardness in the heat-affected zone; and Equation (1) described below is satisfied, where D (mm) is a distance from a melting boundary portion of the nugget to the softest zone, and if there is only one steel sheet member having the highest tensile strength of the plural steel sheet members, t (mm) is a thickness of this steel sheet member, whereas, if there are plural steel sheet members having the highest tensile strength, t (mm) is a thickness of a steel sheet member having the thinnest thickness of these steel sheet members.

$$D \leq t^{0.2} \qquad \text{Equation (1)}$$

(3) In the overlap-welded member according to (1) or (2) described above, the plural steel sheet members may include a hot-stamped member.

(4) A third aspect of the present invention provides an automobile part including the overlap-welded member according to any one of (1) to (3) described above.

(5) A fourth aspect of the present invention provides a method of welding an overlapped portion, including a resistance spot welding process in which a spot-welded portion is formed through resistance spot welding in an overlapped portion including a plurality of steel sheet members, the spot-welded portion including: a nugget; a heat-affected zone formed in the vicinity of the nugget; and a softest zone having the lowest Vickers hardness in the heat-affected zone, and a tempering process of forming, between a central portion of the nugget and the softest zone, a tempered area made out of tempered martensite having Vickers hardness of not more than 120% in a case where Vickers hardness of the softest zone is 100%.

(6) In the method of welding an overlapped portion according to (5) described above, in the resistance spot welding process, energization may be performed so as to satisfy Equation (2) described below, where: T (second) is an energization time in the resistance spot welding; if there is only one steel sheet member having the highest tensile strength of the plural steel sheet members, t (mm) is a thickness of this steel sheet member, whereas, if there are plural steel sheet members having the highest tensile strength, t (mm) is a thickness of a steel sheet member having the thinnest thickness of these steel sheet members; and cyc (second) is a period of time for one cycle of energization in the resistance spot welding.

$$5t \times cyc \leq T \leq (5t+4) \times cyc \qquad \text{Equation (2)}$$

(7) In the method of welding an overlapped portion according to (5) described above, it may be possible that the method further include, before the resistance spot welding process, applying a preheat electric current I (kA) to the overlapped portion in a state where an energization time $T_1$ (second), a period of time cyc (second) for one cycle of energization, and a thickness t (mm) satisfy Equation (3) described below; as for the thickness t (mm), if there is only one steel sheet member having the highest tensile strength of the plurality of steel sheet members, a thickness of this steel sheet member is used, whereas, if there are a plurality of steel sheet members having the highest tensile strength, a thickness of a steel sheet member having the thinnest thickness of these steel sheet members is used; in the resistance spot welding process, a welding electric current $I_0$ (kA) not more than a splash occurring current is applied to the overlapped portion in a state where Equation (4) described below is satisfied, where $T_2$ (second) is an energization time, and cyc (second) is a period of time for one cycle of energization in the resistance spot welding; and the preheat electric current I (kA) and the welding electric current $I_0$ (kA) satisfy Equation (5) described below.

$$5t \times cyc \leq T_1 \leq (5t+8) \times cyc \qquad \text{Equation (3)}$$

$$5t \times cyc \leq T_2 \leq (5t+4) \times cyc \qquad \text{Equation (4)}$$

$$0.3I_0 \leq I \leq 0.7I_0 \qquad \text{Equation (5)}$$

(8) In the method of welding an overlapped portion according to (5) described above, it may be possible that, in the resistance spot welding process, the resistance spot welding be performed so as to satisfy Equation (6) described below, where D (mm) is a distance from a melting boundary portion of the nugget to the softest zone, and if there is only one steel sheet member having the highest tensile strength of the plural steel sheet members, t (mm) is a thickness of this steel sheet member, whereas, if there are plural steel sheet members having the highest tensile strength, t (mm) is a thickness of a steel sheet member having the thinnest thickness of these steel sheet members, and the tempering process is a subsequent energization process in which the tempered area is formed through subsequent energization.

$$D \leq t^{0.2} \qquad \text{Equation (6)}$$

(9) In the method of welding an overlapped portion according to (8) described above, in the resistance spot welding process, energization may be applied so as to satisfy Equation (7) described below, where T (second) is an energization time in the resistance spot welding, and eye (second) is a period of time for one cycle of energization in the resistance spot welding.

$$5t \times cyc \leq T \leq (5t+4) \times cyc \qquad \text{Equation (7)}$$

(10) In the method of welding an overlapped portion according to (8) described above, it may be possible that the method further include, before the resistance spot welding process: applying a preheat electric current I (kA) to the overlapped portion in a state where an energization time $T_1$ (second), a period of time eye (second) for one cycle of energization, and the thickness t (mm) satisfy Equation (8) described below; in the resistance spot welding process, a welding electric current $I_0$ (kA) not more than a splash occurring current is applied to the overlapped portion in a state where Equation (9) described below is satisfied, where $T_2$ (second) is an energization time, and cyc (second) is a period of time for one cycle of energization; and the preheat electric current I (kA) and the welding electric current $I_0$ (kA) satisfy Equation (10) described below.

$$5t \times cyc \leq T_1 \leq (5t+8) \times cyc \qquad \text{Equation (8)}$$

$$5t \times cyc \leq T_2 \leq (5t+4) \times cyc \qquad \text{Equation (9)}$$

$$0.3I_0 \leq I \leq 0.7I_0 \qquad \text{Equation (10)}$$

(11) A fifth aspect of the present invention provides a method of welding an overlapped portion including a resistance spot welding process in which a spot-welded portion is formed in an overlapped portion including a plurality of steel sheet members, the spot-welded portion including: a nugget; a heat-affected zone formed in the vicinity of the nugget; and a softest zone having the lowest Vickers hardness in the heat-affected zone, and in the resistance spot welding process, resistance spot welding is performed so as to satisfy Equation (11) described below, where D (mm) is a distance from a melting boundary portion of the nugget to the softest zone, and if there is only one steel sheet member having the highest tensile strength of the plural steel sheet members, t (mm) is a thickness of this steel sheet member, whereas, if there are plural steel sheet members having the highest tensile strength, t (mm) is a thickness of a steel sheet member having the thinnest thickness of these steel sheet members.

$$D \leq t^{0.2} \quad \text{Equation (11)}$$

(12) In the method of welding an overlapped portion according to (11) described above, in the resistance spot welding process, energization may be applied so as to satisfy Equation (12) described below, where T (second) is an energization time in the resistance spot welding, and cyc (second) is a period of time for one cycle of energization in the resistance spot welding.

$$5t \times cyc \leq T \leq (5t+4) \times cyc \quad \text{Equation (12)}$$

(13) In the method of welding an overlapped portion according to (11) described above, it may be possible that the method further include, before the resistance spot welding process, applying a preheat electric current I (kA) to the overlapped portion in a state where an energization time $T_1$ (second), a period of time cyc (second) for one cycle of energization, and the thickness t (mm) satisfy Equation (13) described below; in the resistance spot welding process, a welding electric current $I_0$ (kA) not more than a splash occurring current is applied to the overlapped portion in a state where Equation (14) described below is satisfied, where $T_2$ (second) is an energization time, and cyc (second) is a period of time for one cycle of energization; and the preheat electric current I (kA) and the welding electric current $I_0$ (kA) satisfy Equation (15) described below.

$$5t \times cyc \leq T_1 \leq (5t+8) \times cyc \quad \text{Equation (13)}$$

$$5t \times cyc \leq T_2 \leq (5t+4) \times cyc \quad \text{Equation (14)}$$

$$0.3 I_0 \leq I \leq 0.7 I_0 \quad \text{Equation (15)}$$

(14) A sixth aspect of the present invention provides a method of manufacturing an overlap-welded member in which an overlapped portion including plural steel sheet members is joined at a spot-welded portion, the method including: overlapping the plural steel sheet members at a position of the overlapped portion; and welding the overlapped portion through the method of welding an overlapped portion according to any one of (5) to (13) described above.

It should be noted that, in this specification, "cyc" represents one cycle (1/frequency) (second) of power supply used for energization in the resistance spot welding. In the case of 60 Hz, 1×cyc is (1/60) (second), and in the case of 50 Hz, 1×cyc is (1/50) (second).

Effects of the Invention

According to the overlap-welded member, the automobile part including the overlap-welded member, the method of welding an overlapped portion, and the method of manufacturing the overlap-welded member of the present invention, it is possible to improve the peel strength of the spot-welded portion.

EMBODIMENTS OF THE INVENTION

The present inventors carried out thorough investigations on improving the peel strength in the case where plural steel sheet members including at least one steel sheet member containing martensite are joined at a spot-welded portion in an overlapped portion. As a result, it was found that, by applying single energization (short-time single energization) under a short-time energization condition in which an electric current value is increased and an energization period of time is shorter than conventional one, the HAZ hardened portion is reduced, and a distance between a nugget end and the softest zone in HAZ is reduced.

Furthermore, it was also found that, with the reduction in the distance between the nugget end and the softest zone in HAZ, the stress acting at the time of load applied on a nugget end portion area in the peeling direction is alleviated, and the peel strength largely improves.

On the basis of the findings described above, in place of the subsequent energization with the conventional type that needs longer time, the present inventors developed a method that can improve the strength with single energization.

Furthermore, it was also found that, by reducing the distance between the nugget end and the softest zone in HAZ, and applying the subsequent energization, the nugget and the HAZ hardened portion are tempered, whereby it is possible to suppress hard portions being locally formed between the nugget end and the softest zone in HAZ. Thus, the peel strength of the spot-welded portion is improved as compared with the subsequent energization with the conventional type.

Below, the present invention made on the basis of the findings described above will be described in detail with reference to the drawings.

Figure 1:
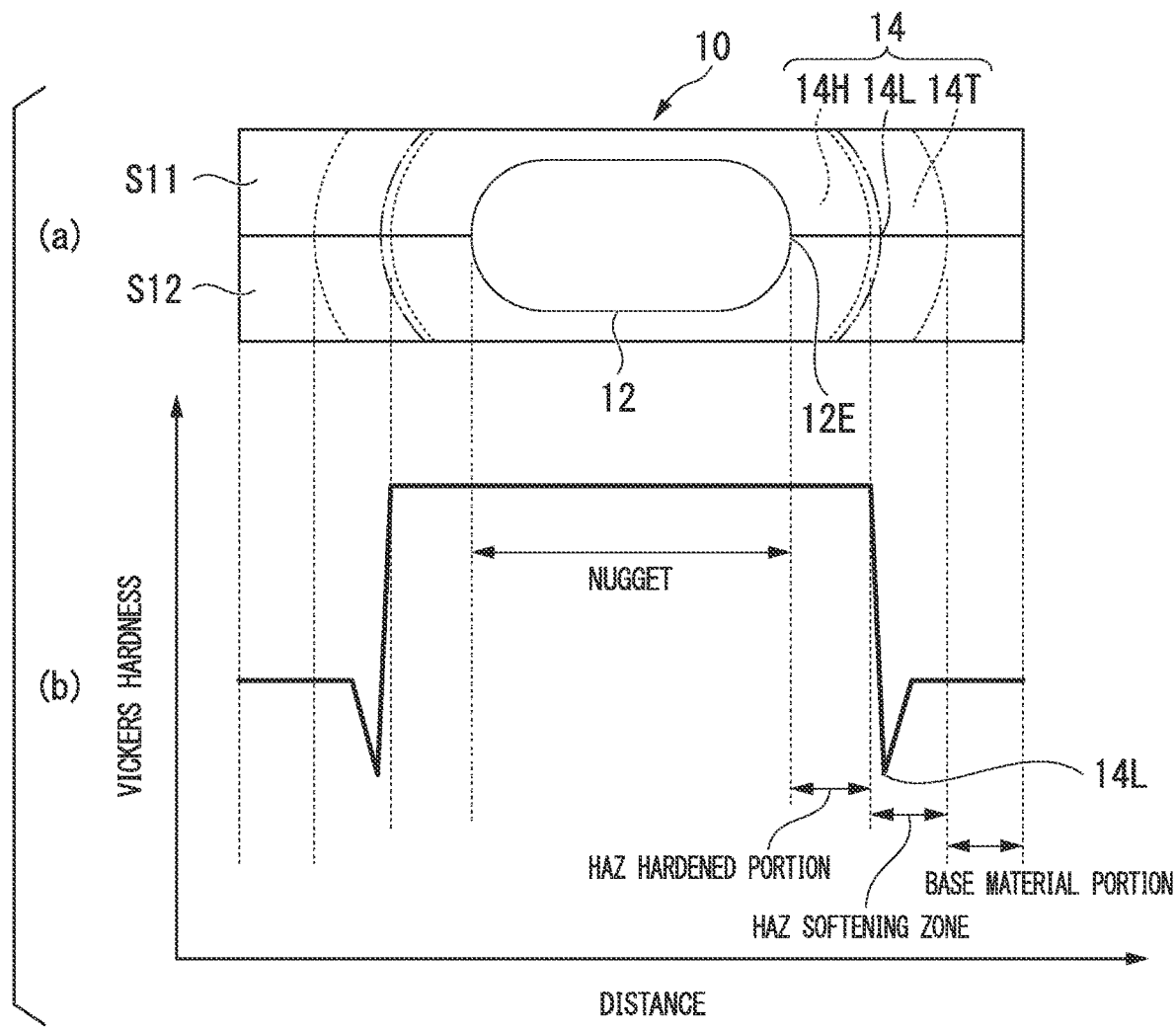
FIG. 1 is a diagram schematically illustrating distribution of hardness in a spot-welded portion in the case where conventional energization conditions are applied to a TRIP member.
Figure 2A:
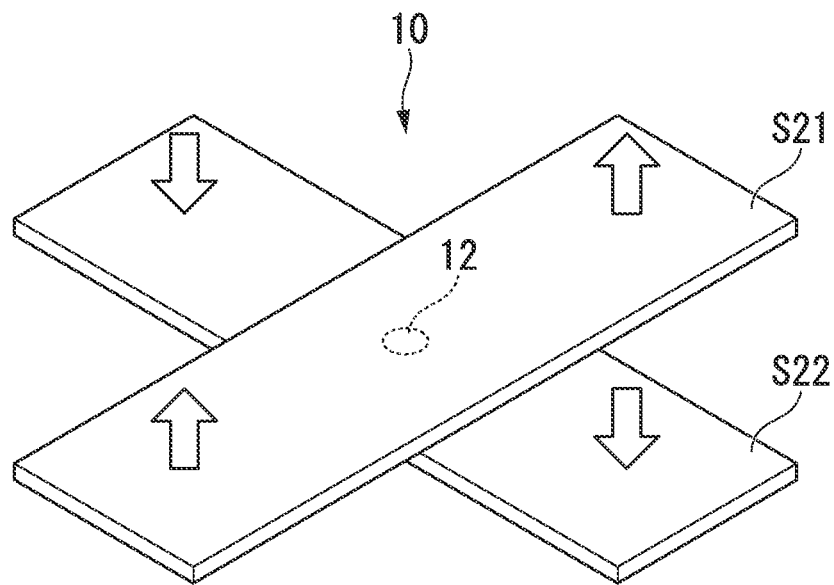
FIG. 2A is a perspective view schematically illustrating a cross-tension test.
Figure 2B:
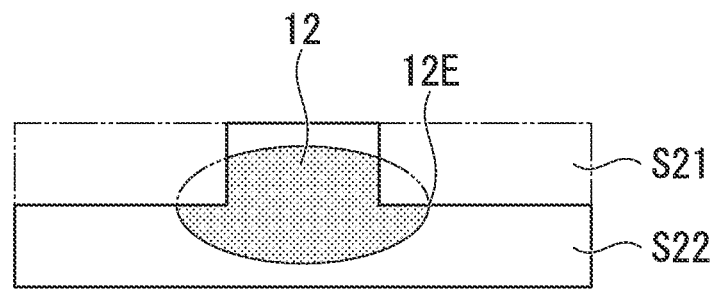
FIG. 2B is a diagram illustrating a fracture mode concerning a spot-welded portion with a cross-tension test, and is a sectional view illustrating a partial plug fracture.
Figure 2C:
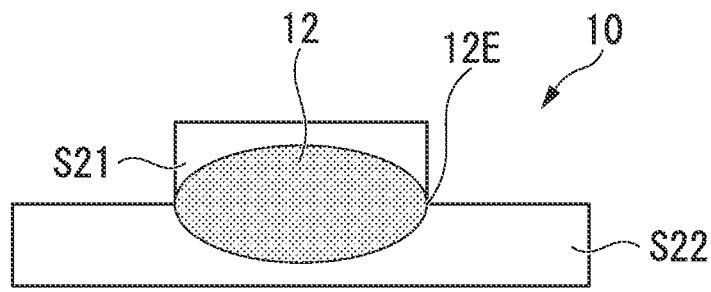
FIG. 2C is a diagram illustrating a fracture mode concerning a spot-welded portion with a cross-section test, and is a sectional view illustrating a plug fracture.
Figure 2D:
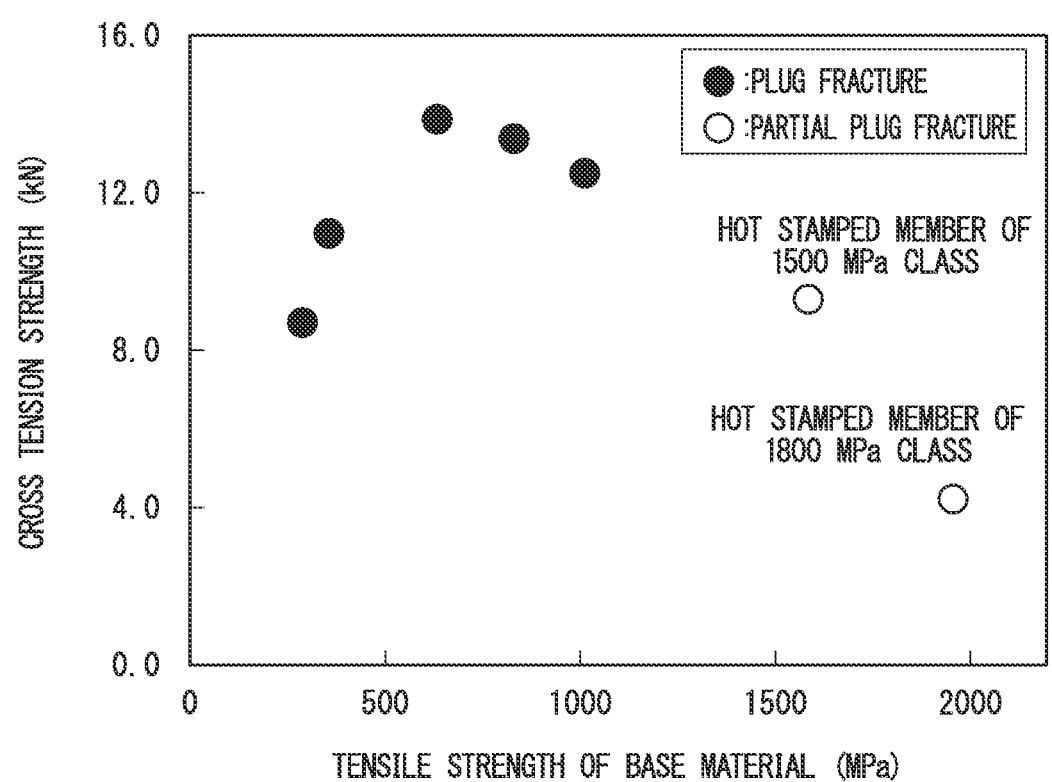
FIG. 2D is a diagram illustrating an example of a correlation between tensile strength of a base metal and a cross-tension strength.
Figure 3:
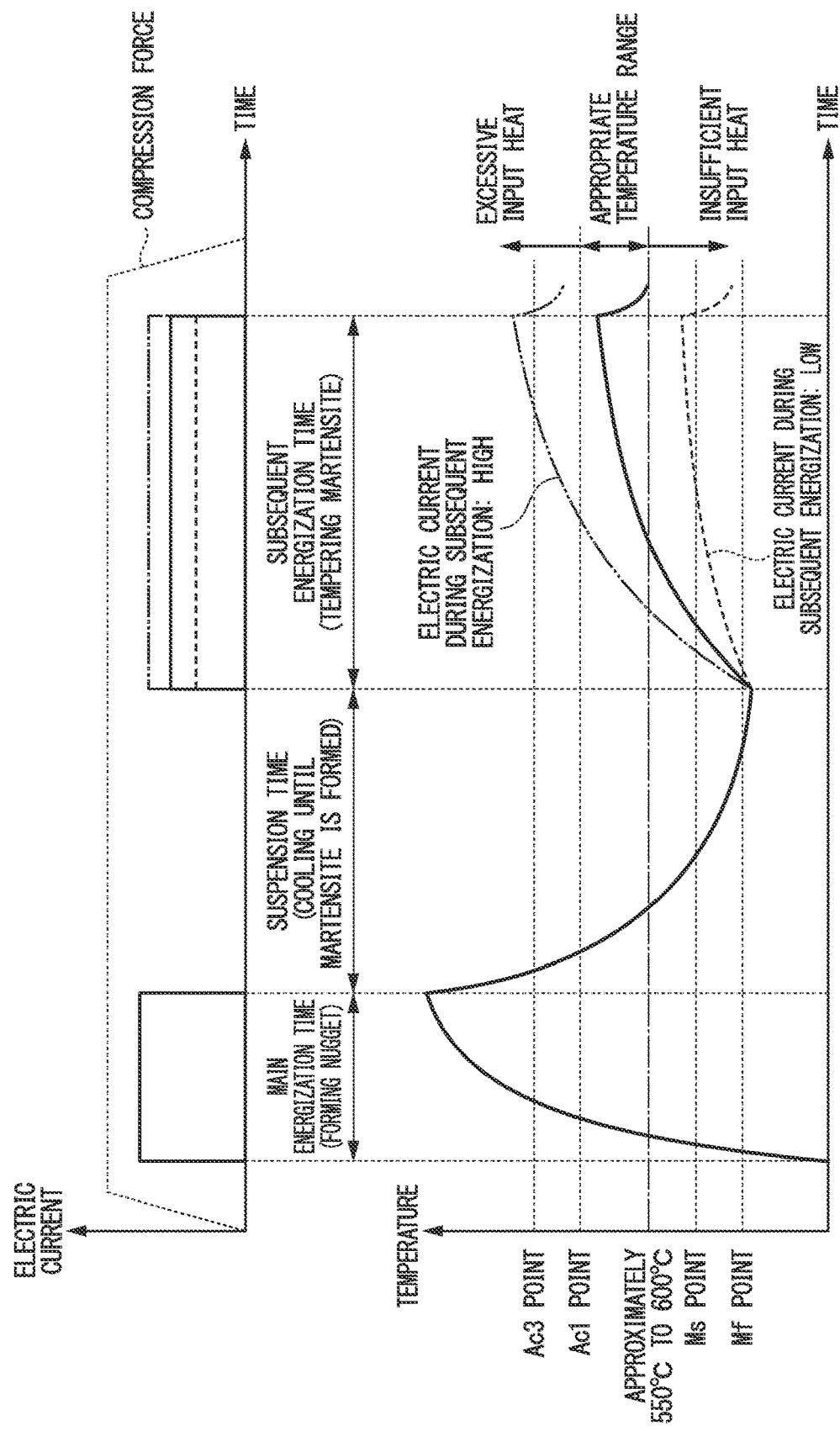
FIG. 3 is a diagram schematically illustrating a subsequent energization method.
Figure 4:
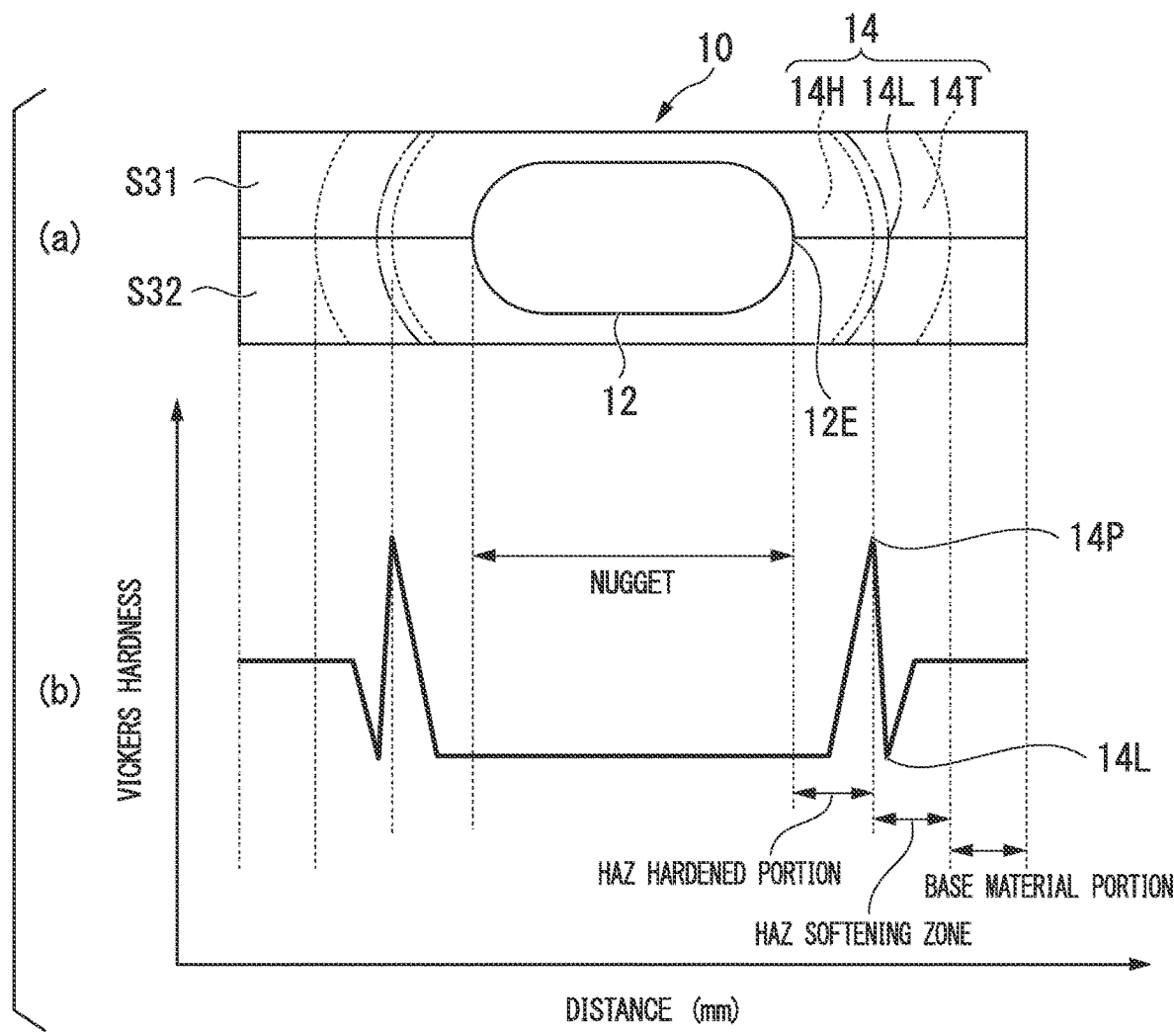
FIG. 4 is a diagram schematically illustrating distribution of hardness in a spot-welded portion after the spot-welded portion is formed by overlapping test pieces according to a subsequent energization method illustrated in FIG. 3, and applying subsequent energization.
Figure 5:
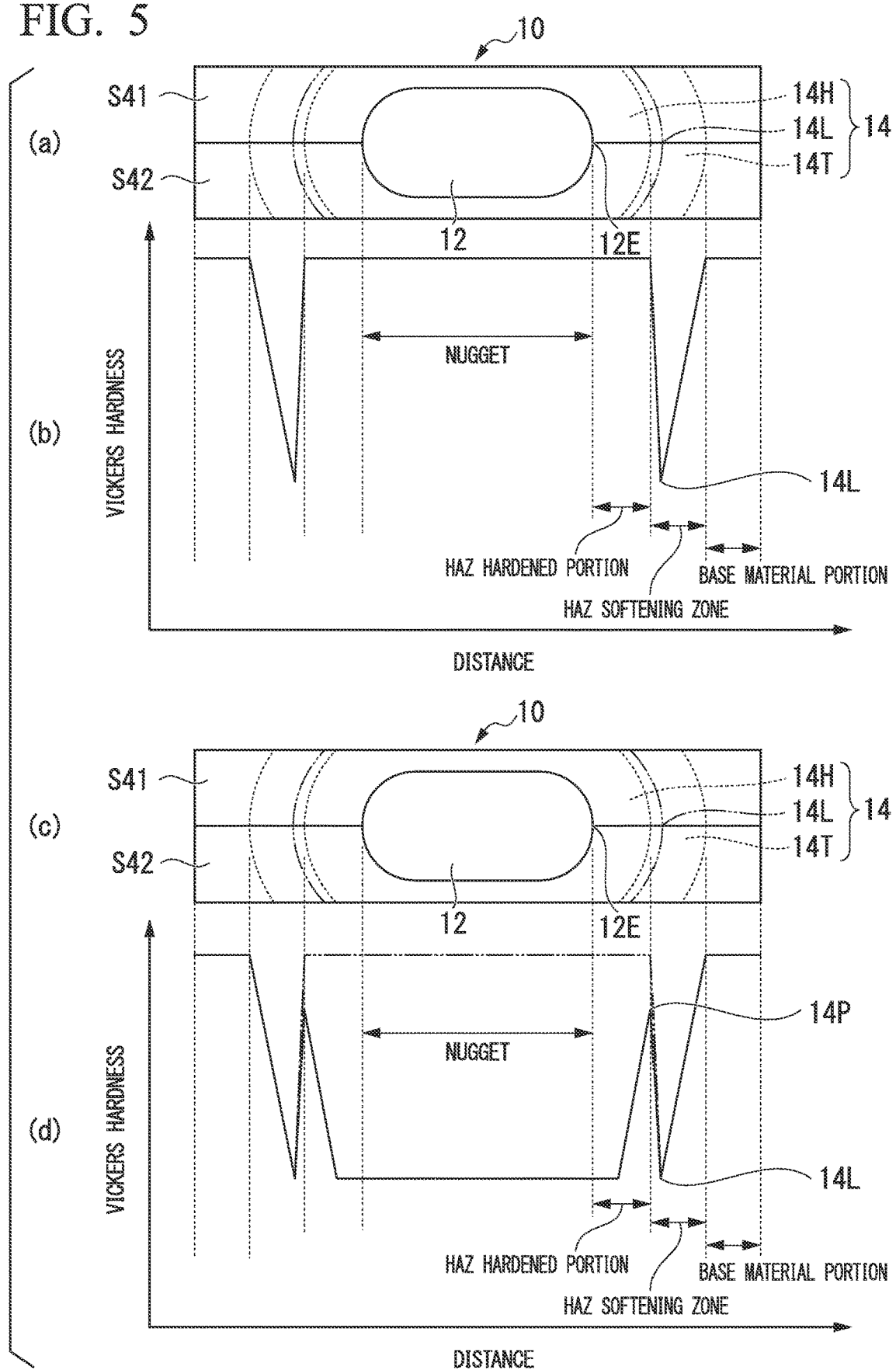
FIG. 5 is a diagram schematically illustrating changes of a HAZ in a spot-welded portion in the case where the spot-welded portion formed on a hot-stamped member is subjected to subsequent energization.
Figure 6:
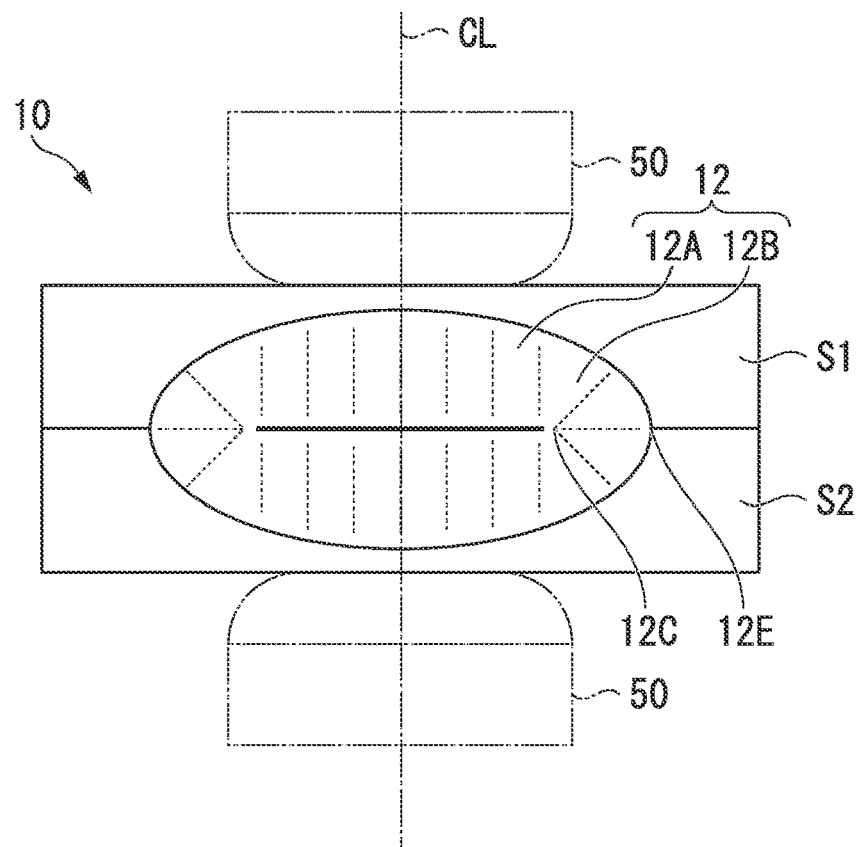
FIG. 6 is a diagram illustrating a schematic configuration of a spot-welded portion including a nugget according to an embodiment of the present invention.

FIG. 6 is a sectional view illustrating a spot-welded portion, which illustrates the schematic configuration of a spot-welded portion 10 formed in an overlap-welded member used, for example, as an automobile part, according to an embodiment of the present invention.

The overlap-welded member according to this embodiment is formed by joining steel sheet members S1 and S2 through a spot-welded portion 10 as illustrated in FIG. 6.

As illustrated in FIG. 6, a nugget 12 is formed in an overlapped portion of the steel sheet members S1 and S2 through energization applied from a pair of electrodes 50, 50, which are used for resistance spot welding and to squeeze the steel sheet members S1 and S2 in the thickness direction between the pair of electrodes with the central line CL of electrodes 50 being the center.

As for molten metal generated through the energization, solidification grows in an area in the vicinity of the central line CL and in contact with the electrodes 50 toward the thickness direction due to heat dissipated to the electrodes 50, whereas, in an area distant from the central line CL of the electrodes 50, solidification grows toward the central direction of the nugget (toward the central line CL of the electrodes) in addition to toward the thickness direction.

As a result, the nugget 12 includes an area 12A where dendrite grows in the thickness direction, and an area 12B where dendrite grows so as to intersect the thickness direction.

In this specification, when the overlapped portion is viewed from the thickness direction, the nugget end 12E represents the outermost boundary (in other words, melting boundary portion of the nugget 12) that melts when the nugget 12 is formed, and the nugget end portion area 12B represents an area from a meeting portion 12C between the area 12A and the area 12B to the nugget end 12E.

Figure 7:
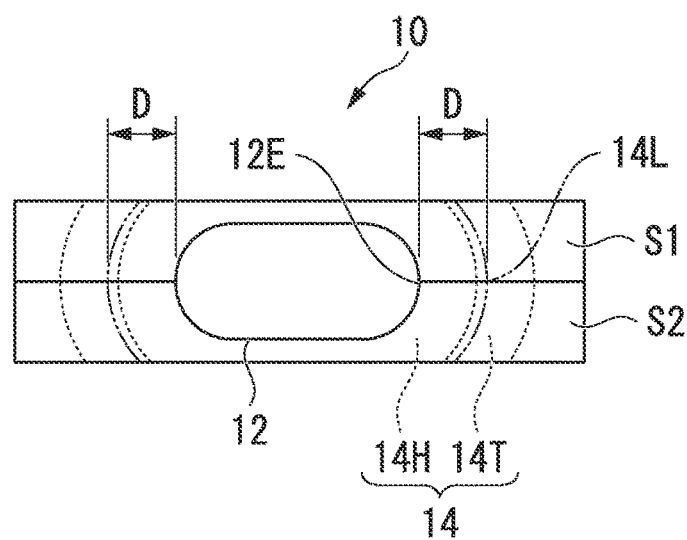
FIG. 7 is a diagram illustrating a schematic configuration of a nugget and a HAZ in the same spot-welded portion.

FIG. 7 is a sectional view illustrating a spot-welded portion, which illustrates the spot-welded portion 10 where the overlapped portion is welded. The spot-welded portion 10 includes the nugget 12 formed through spot welding, and the HAZ 14 formed in the vicinity of this nugget 12 through spot welding.

The HAZ 14 includes a HAZ hardened portion 14H formed next to the nugget 12, and a HAZ softening zone 14T formed around the HAZ hardened portion 14H.

Furthermore, the softest zone 14L in HAZ having the lowest Vickers hardness is formed in the vicinity of the inner peripheral portion in the HAZ softening zone 14T.

The reference character D illustrated in FIG. 7 represents a distance between the nugget end 12E and the softest zone 14L in HAZ.

Figure 8:
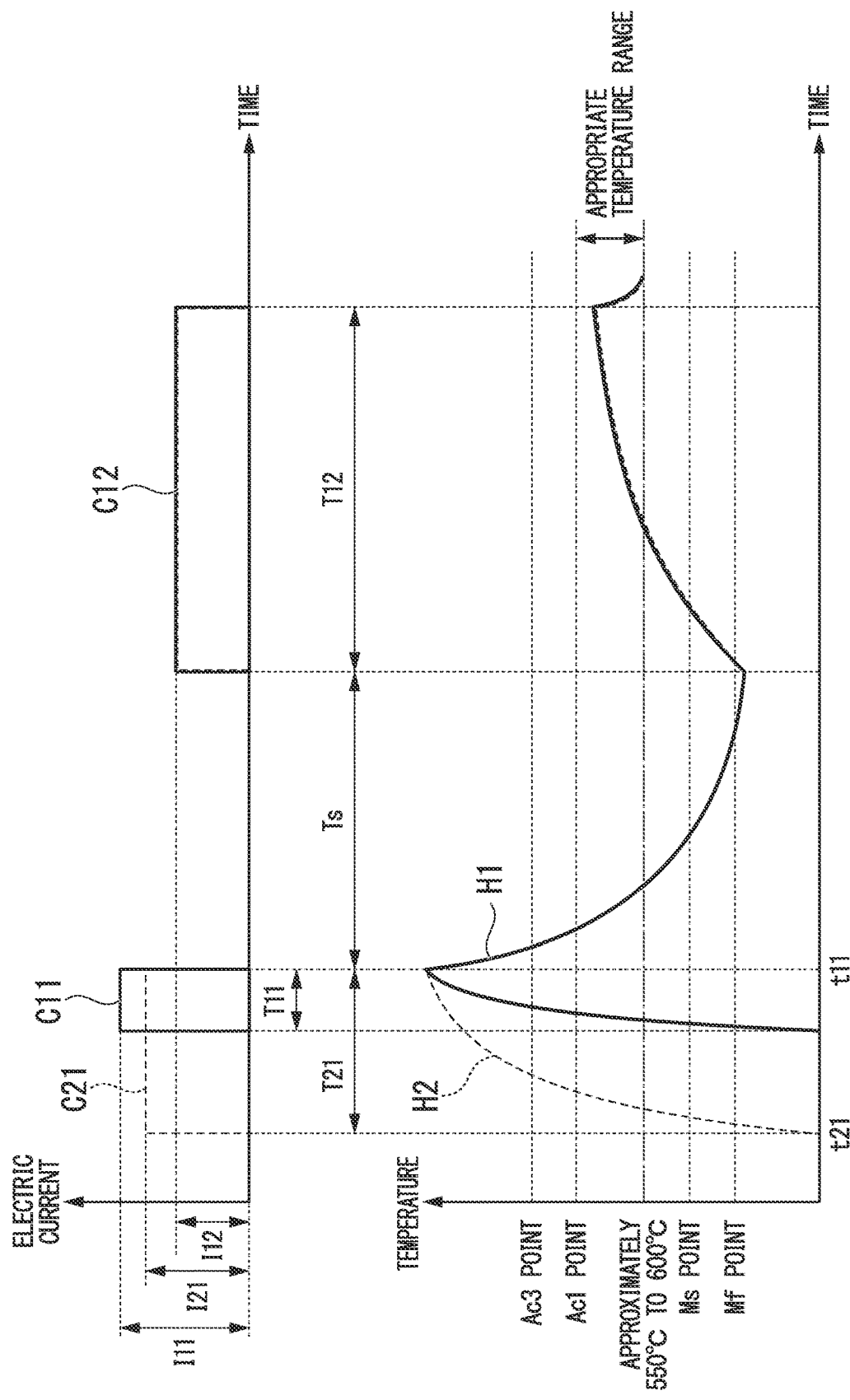
FIG. 8 is a diagram explaining energization conditions in resistance spot welding according to an embodiment of the present invention.

FIG. 8 is a diagram illustrating energization conditions in resistance spot welding according to this embodiment.

As illustrated in FIG. 8, in the case of a short-time energization condition C11 according to this embodiment, resistance spot welding is performed by first applying single energization in which an energization electric current I11, which is higher than an energization electric current I21 under a normal energization condition C21, is applied for an energization time T11, which is shorter than a conventional normal energization time T21.

The broken line in FIG. 8 indicates the first energization C21 (an electric current value I21 and an energization time T21) under a normal condition, where the electric current value I11>the electric current value I21, and the energization time T11 (cyc)<the energization time T21 (cyc).

Furthermore, in FIG. 8, the reason that the short-time energization condition C11 is illustrated from the intermediate stage in the normal energization condition C21 on the time axis is to match the completion times of energization.

In the short-time energization condition C11 according to this embodiment, as illustrated in FIG. 8, the molten metal generated at the time of forming the nugget 12 through energization is rapidly cooled after the single energization is completed, and temperatures thereof pass through the Ms point and are decreased to the Mf point or lower, so that martensite is formed.

Furthermore, by comparing a temperature curve H1 of the nugget 12 under the short-time energization condition C11 with a temperature curve H2 of the nugget under the normal energization condition C21, the joined portion is melted, and the nugget 12 is formed under the short-time energization condition C11 in a shorter period of time than those under the normal energization condition C21.

Thus, with the short-time energization condition C11, the excessive heat flow to the vicinity of the nugget 12 is suppressed, the size of the HAZ hardened portion is reduced, and the distance D between the nugget end 12E and the softest zone 14L in HAZ is reduced.

As a result, only with the single energization described above are the strains at the time of peeling concentrated on portions other than the nugget end portion area 12B, and the stress concentrated on the nugget end portion area 12B can be alleviated, whereby the peel strength improves.

It should be noted that the spot-welded portion 10 formed with single energization under the short-time energization condition C11 may be used as it is without applying additional processing. Furthermore, after a predetermined suspension period of time Ts elapses, it may be possible to apply subsequent energization (in other words, the second energization) under a subsequent energization condition C12 to the spot-welded portion 10 thus formed.

By applying the energization under the subsequent energization condition C12 (an electric current value I12 and an energization time T12) to the spot-welded portion 10 formed under the short-time energization condition C11 after energization is suspended for the suspension period of time Ts, the nugget 12 is heated to temperatures not less than a temperature (approximately 550 to 600° C.) at which tempering is possible and not more than $Ac_1$, and then, is gradually cooled, whereby tempered martensite can be obtained without re-quenching the HAZ 14.

As described above, in the case of the short-time energization condition C11, the electric current value I11 is set so as to be larger than the electric current value I21 under the normal energization condition C21, and the energization time T11 is set so as to be shorter than the energization time T21 under the normal energization condition C21. Thus, temperatures of the nugget 12 are raised in a short period of time, and transference of the heat generated through energization to the vicinity thereof is not developed, whereby the HAZ 14 is less likely to become high temperature as compared with the normal condition.

As a result, it can be considered that the width of the HAZ hardened portion 14H is narrow, and the distance D between the nugget end 12E and the softest zone 14L in HAZ is reduced.

As described above, by forming the nugget 12 under the short-time energization condition C11, the width of the HAZ hardened portion 14H can be made narrow, whereby the nugget 12 and the HAZ hardened portion 14H are sufficiently tempered.

Thus, it is possible to prevent high Vickers hardness portions from being formed between the nugget end 12E and the softest zone 14L in HAZ.

More specifically, since the HAZ hardened portion 14H is softened in a uniform manner, deformation becomes easy, and stress acting on the nugget end portion area 12B at the time of peeling is reduced, whereby it is possible to improve the peel strength.

As described above, by employing the short-time energization condition C11 and the subsequent energization condition C12, Vickers hardness between the softest zone 14L in HAZ and the nugget end 12E can be made to 120% or lower in the case where Vickers hardness in the softest zone 14L in HAZ is 100%, whereby toughness of the spot-welded portion 10 can be sufficiently secured.

Below, a relationship between distances (mm) from the melting boundary of the nugget 12 and Vickers hardness will be described with reference to FIG. 9A and FIG. 9B.

Figure 9A:
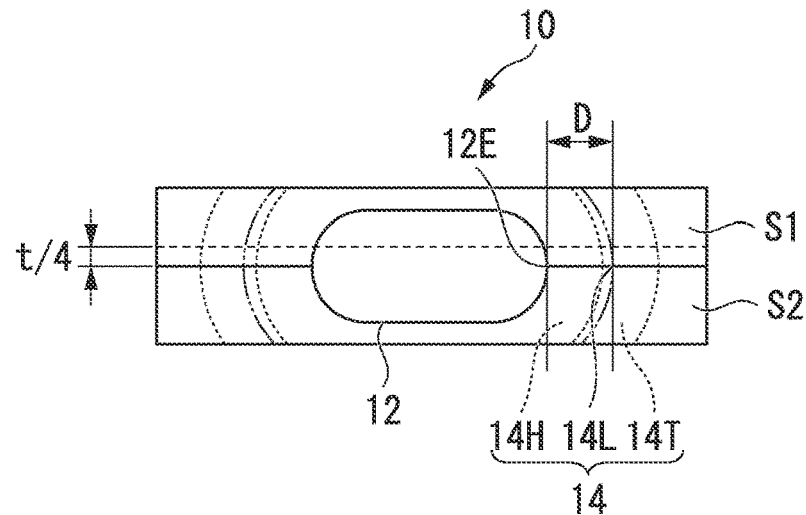
FIG. 9A is a diagram schematically illustrating portions of a spot-welded portion according to an embodiment of the present invention where hardness is measured.
Figure 9B:
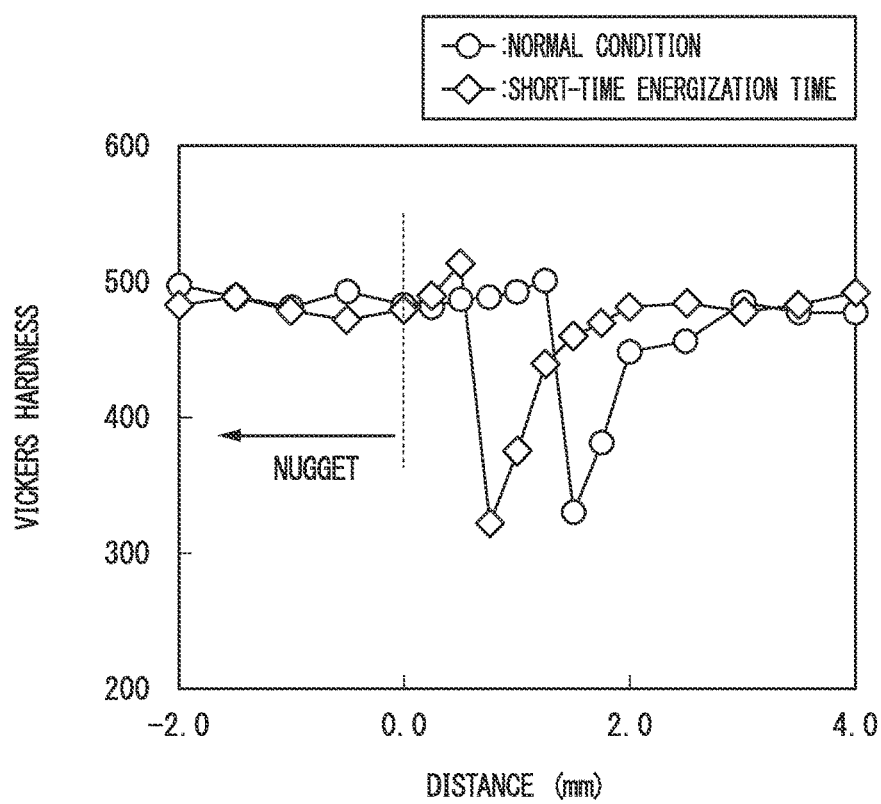
FIG. 9B is a graph showing a relationship between distances (mm) from a melting boundary of a nugget and Vickers hardness.

FIG. 9A and FIG. 9B are diagrams each illustrating a case where a first energization is applied to a hot-stamped member of a 1500 MPa class having a thickness of 1.6 mm under a "(a) short-time energization condition" and a "(b) normal condition" according to this embodiment. FIG. 9A is a sectional view illustrating a spot-welded portion, and FIG. 9B is a graph showing distribution of hardness in the spot-welded portion 10.

As for measurement of distribution of hardness, as illustrated in FIG. 9A, measurement is performed at a position located at a distance of ¼ of the thickness from the joining surface of the steel sheet members S1 and S2 toward the steel sheet member S1 and the inner side of the steel sheet member S1 by applying a load of 9.8 N at 0.5 mm pitches according to JIS Z 2244.

In the graph shown in FIG. 9B, the "blank diamonds" represent the short-time energization condition, and the "blank circles" represent the normal energization condition.

It should be noted that the energization time in the short-time energization condition is set to 9×cyc, the energization time in the normal condition is set to 20×cyc, and the electric current value is adjusted such that the nugget diameter is 4 √t (mm) (t represents a thickness).

From FIG. 9A and FIG. 9B, it can be understood that the distance D from the nugget end 12E to the softest zone 14L in HAZ is reduced by applying the first energization under the "(a) short-time energization condition."

Below, equivalent strain in the case where energization is performed under the short-time energization and the normal condition will be described with reference to FIG. 10A, FIG. 10B, FIG. 11, and FIG. 12.

Equivalent plastic strains in the case of the "(a) short-time energization condition," the "(b) normal condition," and the "(c) no HAZ softening" are obtained through elasto-plastic FEM analysis under the short-time energization and the normal condition. Detailed descriptions will be made below.

Figure 10A:
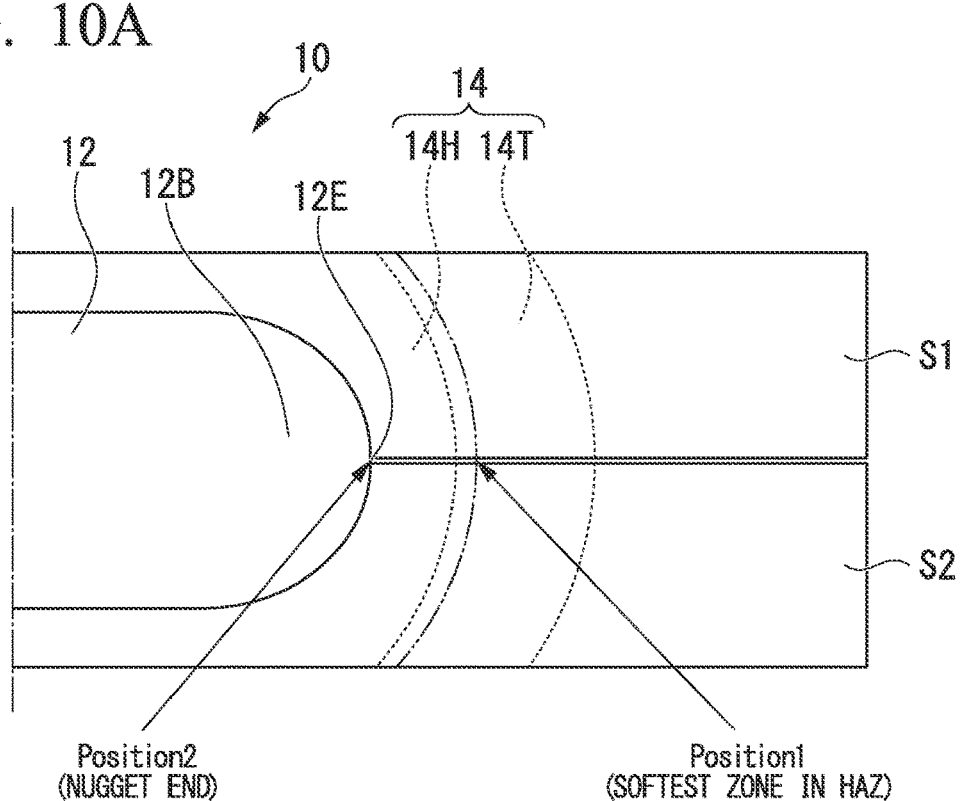
FIG. 10A is a diagram illustrating an analysis model under a short-time energization condition with a distance from a nugget end to the softest zone in HAZ being set to 0.75 mm.

FIG. 10A is a sectional view illustrating a spot-welded portion, which illustrates an analysis model of a test piece for single energization obtained by applying the first energization under the "(a) short-time energization condition"

with the distance D from the nugget end 12E to the softest zone 14L in HAZ being set to 0.75 mm.

Figure 10B:
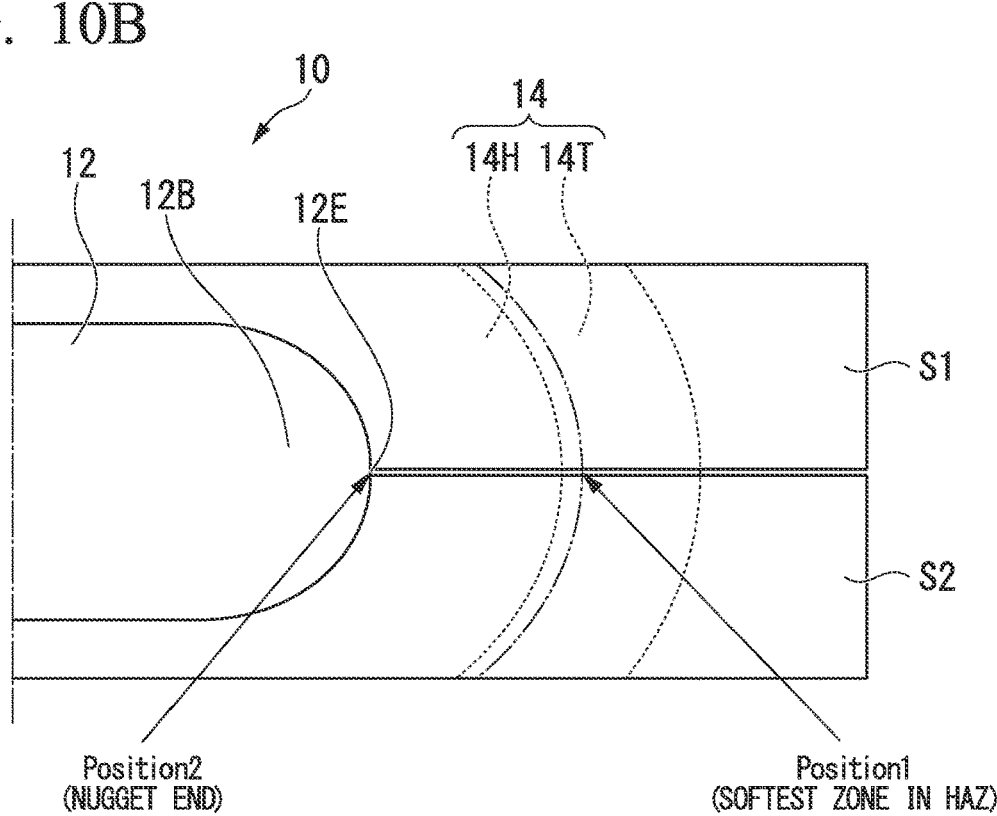
FIG. 10B is a diagram illustrating an analysis model under a normal condition with a distance from a nugget end to the softest zone in HAZ being set to 1.5 mm.

FIG. 10B is a sectional view illustrating a spot-welded portion, which illustrates an analysis model of a test piece for single energization obtained by applying the first energization under the normal condition with the distance D from the nugget end 12E to the softest zone 14L in HAZ being set to 1.5 mm.

It should be noted that, for the analysis models, the distribution of hardness in the HAZ softening zone is varied in a stepwise manner from the hardness of the softest zone to the hardness of the base metal portion on the basis of the measurement results shown in FIG. 9B.

In FIG. 10A and FIG. 10B, the Position 1 represents the softest zone 14L in HAZ, and the Position 2 represents the nugget end 12E.

For the analysis models, three patterns are used, which include a case where the "(a) short-time energization condition" in FIG. 10A is simulated, a case where the "(b) normal condition" in FIG. 10B is simulated, and a case where the "(c) no HAZ softening" is simulated.

Figure 11:
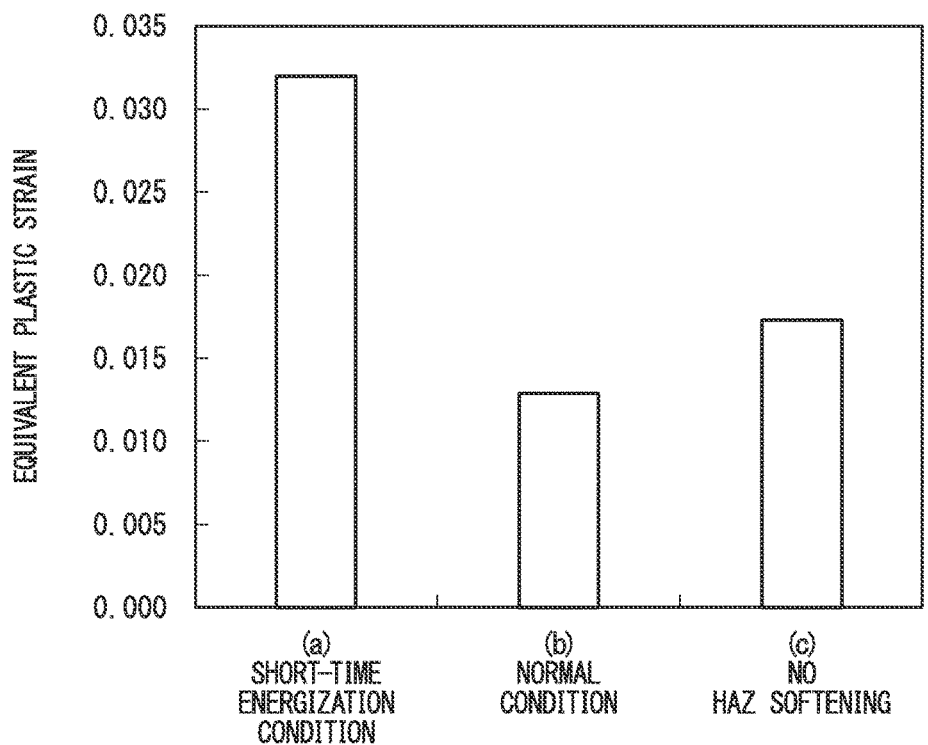
FIG. 11 is a graph related to an analysis model of each spot-welded portion under "(a) short-time energization condition," "(b) normal condition," and "(c) no HAZ softening," and illustrating equivalent plastic strain at Position 1 illustrated in FIG. 10A.

FIG. 11 is a graph showing equivalent plastic strains at the Position 1 illustrated in FIG. 10A in the case where the analysis models formed by the spot-welded portions with the "(a) short-time energization condition," the "(b) normal condition," and the "(c) no HAZ softening" are subjected to cross-tension testing with a load with which the spot-welded portion in the case of the "(b) normal condition" is fractured through the cross-tension testing.

It should be noted that, in FIG. 11, the Position 1 in the analysis model with the "(c) no HAZ softening" is set to the same position as that with the "(b) normal condition."

As shown in the graph in FIG. 11, the equivalent plastic strain at the Position 1 is approximately 0.032 with the "(a) short-time energization condition," which significantly increases as compared with 0.013 with the "(b) normal condition" and approximately 0.018 with the "(c) no HAZ softening."

Figure 12:
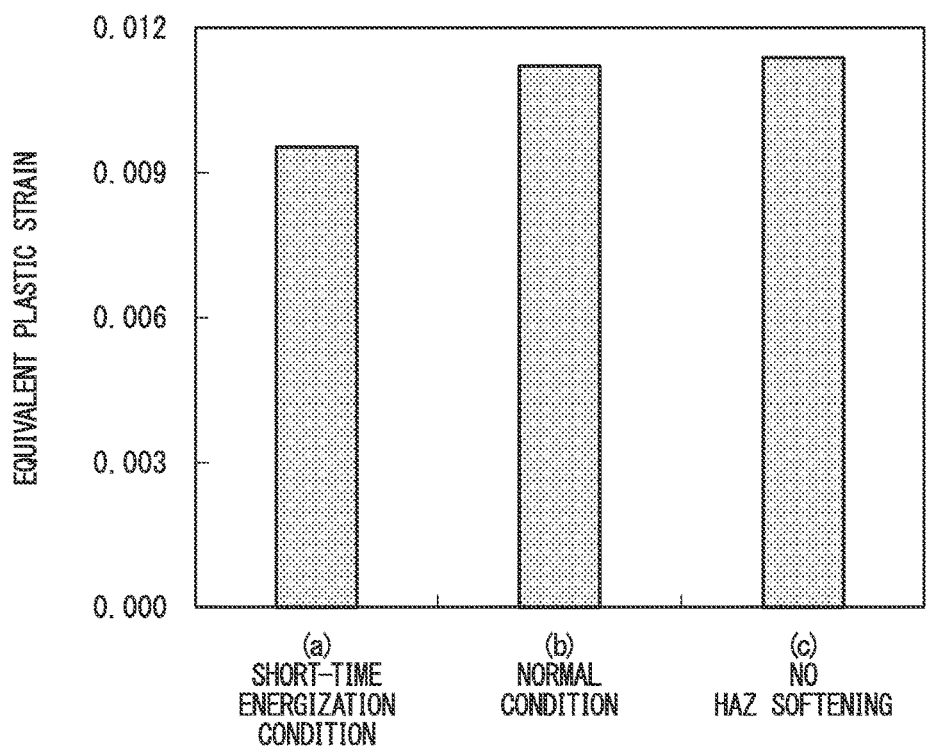
FIG. 12 is a graph related to an analysis model of each spot-welded portion under "(a) short-time energization condition," "(b) normal condition," and "(c) no HAZ softening," and illustrating equivalent plastic strain at Position 2 illustrated in FIG. 10A.

FIG. 12 is a graph showing equivalent plastic strains at the Position 2 illustrated in FIG. 10A in the case where the analysis models formed by the spot-welded portions with the "(a) short-time energization condition," the "(b) normal condition," and the "(c) no HAZ softening" are subjected to cross-tension testing with a load with which the spot-welded portion in the case of the "(b) normal condition" is fractured through the cross-tension testing.

It should be noted that, in FIG. 12, the Position 2 in the analysis model with the "(c) no HAZ softening" is set to the same position as that with the "(b) normal condition."

Furthermore, as shown in the graph in FIG. 12, the equivalent plastic strain at the Position 2 is approximately 0.010 with the "(a) short-time energization condition," which decreases as compared with 0.0115 with the "(b) normal condition" and approximately 0.0118 with the "(c) no HAZ softening."

However, at the position of HAZ softening with the "(b) normal condition," the existence or absence of the HAZ softening has a limited effect on the equivalent plastic strain in the end portion area of the nugget, as compared with the "(b) normal condition" and the "(c) no HAZ softening."

More specifically, in the case of the normal condition, the HAZ softening zone 14T provides little effect as to reducing the strains to the nugget end portion area 12B at the time of peeling, and since the HAZ softening zone 14T approaches the nugget end portion area 12B, the strains concentrate on the HAZ softening zone 14T. As a result, it was found that the strains concentrated on the nugget end portion area 12B can be reduced. In other words, with this effect, the peel strength can be increased by using the "short-time energization condition."

Below, conditions appropriate for the overlap-welded member obtained by joining, at the spot-welded portion, overlapped portions including plural steel sheet members, according to this embodiment will be described with reference to FIG. 13A and FIG. 13B.

Figure 13A:
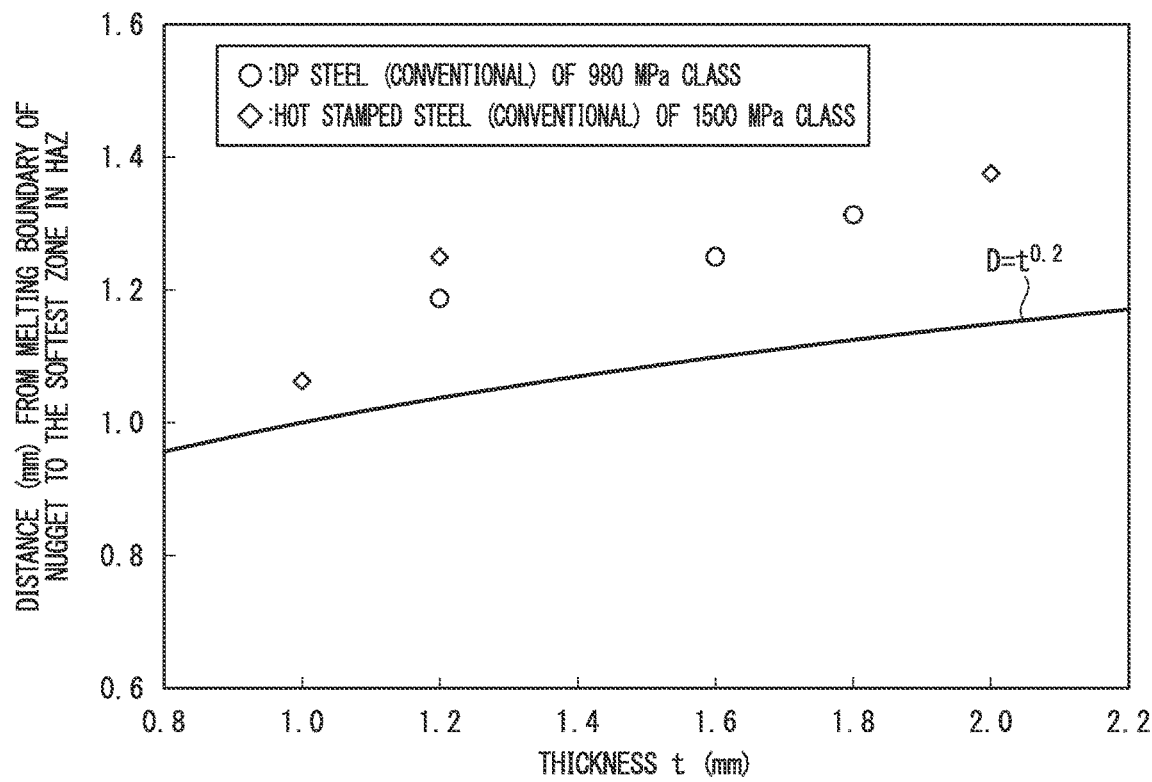
FIG. 13A is a diagram illustrating a relationship between a thickness t and a distance D from a melting boundary of a nugget to a HAZ softening zone.

FIG. 13A is a diagram illustrating a relationship between the thickness t (mm) of the overlapped portion and a distance D (mm) from a melting boundary (end of the nugget) of the nugget to the softest zone in HAZ.

In FIG. 13A, the "blank circles" represent a DP steel of a 980 MPa class with a conventional single energization.

Furthermore, the "blank diamonds" represent a hot-stamp steel of a 1500 MPa class with a conventional single energization.

Here, as for the thickness t (mm) in FIG. 13A, in the case where there is only one steel sheet member having the highest tensile strength of plural steel sheet members, t (mm) is the thickness of this steel sheet member, and in the case where there are plural steel sheet members having the highest tensile strength, t (mm) is the thickness of a steel sheet member having the thinnest thickness of all the steel sheet members.

As illustrated in FIG. 13A, in the case of the single energization with a conventional condition, the distance D between the nugget end 12E and the softest zone 14L in HAZ on the overlapping interface between two steel sheets is formed so as to fall in a range exceeding D (mm)=$t^{0.2}$ (mm). At the time of the cross-tension test, in the case of a sheet set obtained by combining a steel type having low joint strength and a steel type having high joint strength, fracture tends to occur on the side of the low joint strength.

For example, in the case where the strength of the base metal is higher than a 780 MPa class, the cross-tension strength decreases with an increase in the strength of the base metal, and hence, fracture is more likely to occur as the strength of the base metal increases.

Furthermore, in the case of a sheet set having the same steel type but different thicknesses, fracture occurs on the side of the steel sheet having the thinner thickness.

For the reasons described above, the thickness t of a steel sheet member having the thinnest thickness is employed.

Figure 13B:
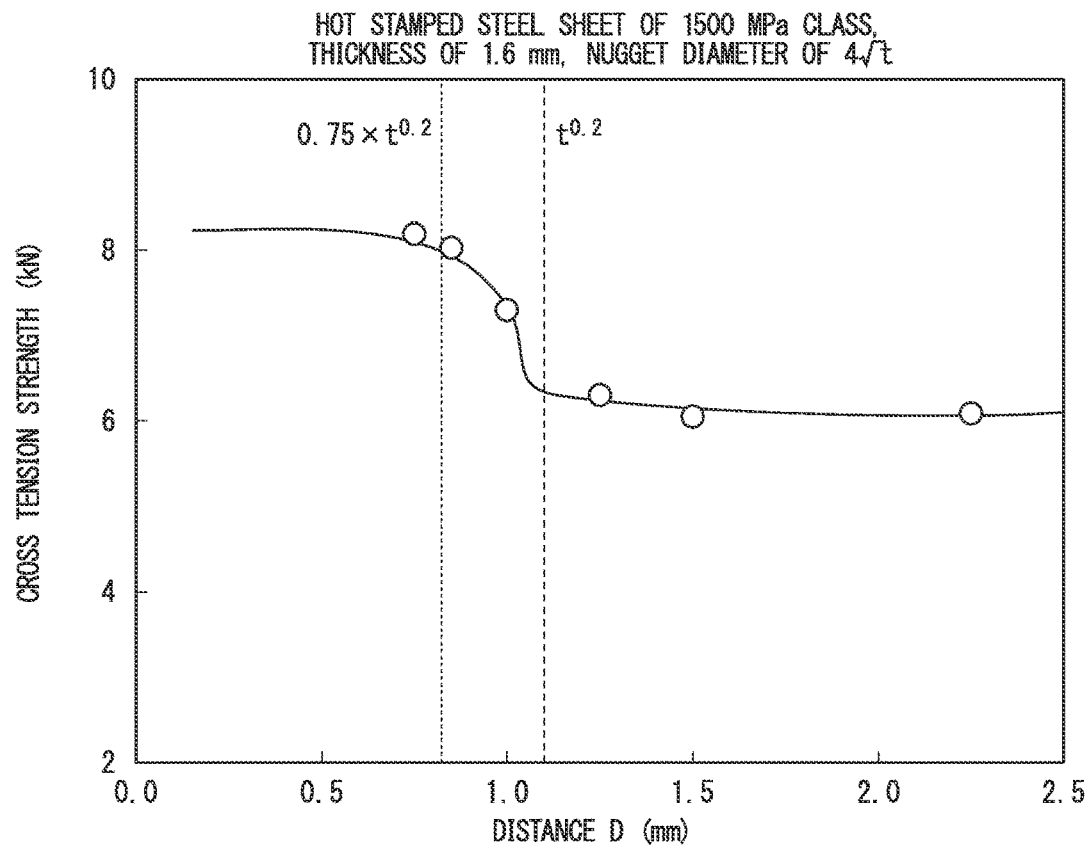
FIG. 13B is a diagram illustrating a relationship between cross-tension strength and distances D from the melting boundary of a nugget to a HAZ softening zone.

FIG. 13B is a diagram illustrating a relationship between the cross-tension strength and the distance D from the nugget end 12E of the spot-welded portion to the HAZ softening zone in the case where the nugget diameter in a hot-stamped member of a 1500 MPa class is 4 √t.

As illustrated in FIG. 13B, by setting the distance D (mm) between the nugget end 12E and the softest zone 14L in HAZ to $t^{0.2}$ (mm) or shorter, the cross-tension strength increases to approximately 7 kN and is made stable, which makes it possible to make the fracture mode to be the plug fracture. Furthermore, by setting the distance D (mm) between the nugget end 12E and the softest zone 14L in HAZ to $0.75\times(t^{0.2})$ (mm) or shorter, the cross-tension strength increases to approximately 8 kN, and is made further stable, which makes the fracture mode to be the plug fracture. This is more favorable.

As described above, by reducing the distance D from the nugget end 12E of the spot-welded portion to the HAZ softening zone 14T, the cross-tension strength improves.

Furthermore, as for the hardness from the base metal toward the nugget end portion area 12B (including the nugget end portion area 12B) on the overlapping interface between these two steel sheet members, the hardness gradually decreases toward the nugget end 12E in a range where the maximum value of Vickers hardness relative to the softest zone 14L in HAZ is approximately 115%, or the hardness is equivalent to the hardness of the softest zone 14L in HAZ.

According to the overlap-welded member of this embodiment, by bringing the HAZ softening zone 14T close to the nugget end portion area 12B, the stress concentration on the nugget end portion area 12B serving as the starting point of the fracture within the nugget (interface fracture, partial plug fracture) is alleviated, whereby it is possible to improve the joint strength.

The effect of improving the joint strength becomes more apparent as the fracture mode changes from the fracture within the nugget (the interface fracture and the partial plug fracture) to the plug fracture.

In particular, as for a joint for which the plug fracture cannot be obtained because the toughness of the nugget 12 itself is not sufficient and the crack propagates into the nugget even if the stress concentration on the nugget end portion area 12B is alleviated, by applying subsequent energization to this joint in addition to optimization of the HAZ softening zone 14T, it is possible to obtain the effect of improving the joint strength stronger than the conventional one.

This mechanism has already been described above.

As described above, if the distance D (mm) from the nugget end 12E to the softest zone 14L in HAZ satisfies $$D \leq t^{0.2}, \quad \text{Equation (1)},$$

it is possible to sufficiently improve the joint strength.

Thus, with the overlap-welded member according to this embodiment, a condition is set such that the distance D from the nugget end 12E to the softest zone 14L in HAZ satisfies Equation (1) described above.

Furthermore, by making the distance D (mm) from the nugget end 12E to the softest zone in HAZ satisfy $$D \leq 0.75 \times (t^{0.2}) \quad \text{Equation (1A),}$$

the fracture mode can be more reliably made to be the plug fracture, which is preferable.

Below, a method of welding the overlap-welded portion using a resistance spot welding process and a tempering process will be described in detail.

(Resistance Spot Welding Process)

In the resistance spot welding process, a spot-welded portion 10 including a nugget 12, a HAZ 14 formed around this nugget 12, and the softest zone 14L having the lowest Vickers hardness in this HAZ 14 is formed through resistance spot welding at an overlapped portion formed by plural steel sheet members.

(Tempering Process)

In the tempering process, a tempered area made out of tempered martensite having the Vickers hardness of 120% or lower in the case where the Vickers hardness of the softest zone 14L is 100% is formed between the central portion of the nugget 12 formed through the resistance spot welding process and the softest zone 14L.

It is preferable to apply subsequent energization to form the tempered area. However, this formation is not limited to through the subsequent energization. It may be possible to use, for example, emission of laser beam to form the tempered area.

With the method of welding an overlapped portion according to this embodiment as described above, the tempered area having the Vickers hardness of 120% or lower in the case where the Vickers hardness of the softest zone 14L is 100% is formed between the central portion of the nugget 12 and the softest zone 14L.

Furthermore, in the resistance spot welding process described above, the nugget 12 may be formed with an energization time T expressed in the following manner, where t (mm) is the thickness, and cyc (second) is a period of time for one cycle of energization in the resistance spot welding.

$$5t \times cyc \leq T \leq (5t+4) \times cyc \quad \text{Equation (2)}$$

In general, in the spot welding, with an increase in the thickness, the energization time increases, and the distance D from the nugget end 12E to the softest zone 14L in HAZ tends to increase. However, with the satisfaction of this Equation (2), the nugget can be stably formed, and the distance D (mm) between the nugget end 12E and the softest zone 14L in HAZ can be more reliably formed so as to be not more than $t^{0.2}$.

In other words, it is possible to stably improve the peel strength at the spot-welded portion.

It should be noted that, as for the thickness t (mm), in the case where there is only one steel sheet member having the highest tensile strength of plural steel sheet members, t (mm) is the thickness of this steel sheet member, and in the case where there are plural steel sheet members having the highest tensile strength, t (mm) is the thickness of a steel sheet member having the thinnest thickness of all the steel sheet members.

(Preheat Energization Process)

As described above, by applying spot welding while satisfying the energization time specified in this embodiment, this spot welding is effective from the viewpoint of the HAZ softening zone 14T. On the other hand, the appropriate electric current range reduces as compared with the conventional energization condition.

In this respect, the present inventors found that it is preferable to perform a preheat energization process before the resistance spot welding process described above is performed, in terms of being able to bring the softest zone in HAZ closer to the end portion area of the nugget as compared with the conventional technique while maintaining the appropriate electric current range (margin of electric current to the splash occurring current) equivalent to the conventional condition.

Here, the above-described effect obtained by performing the preheat energization process will be described with reference to FIG. 14 and FIG. 15.

Figure 14:
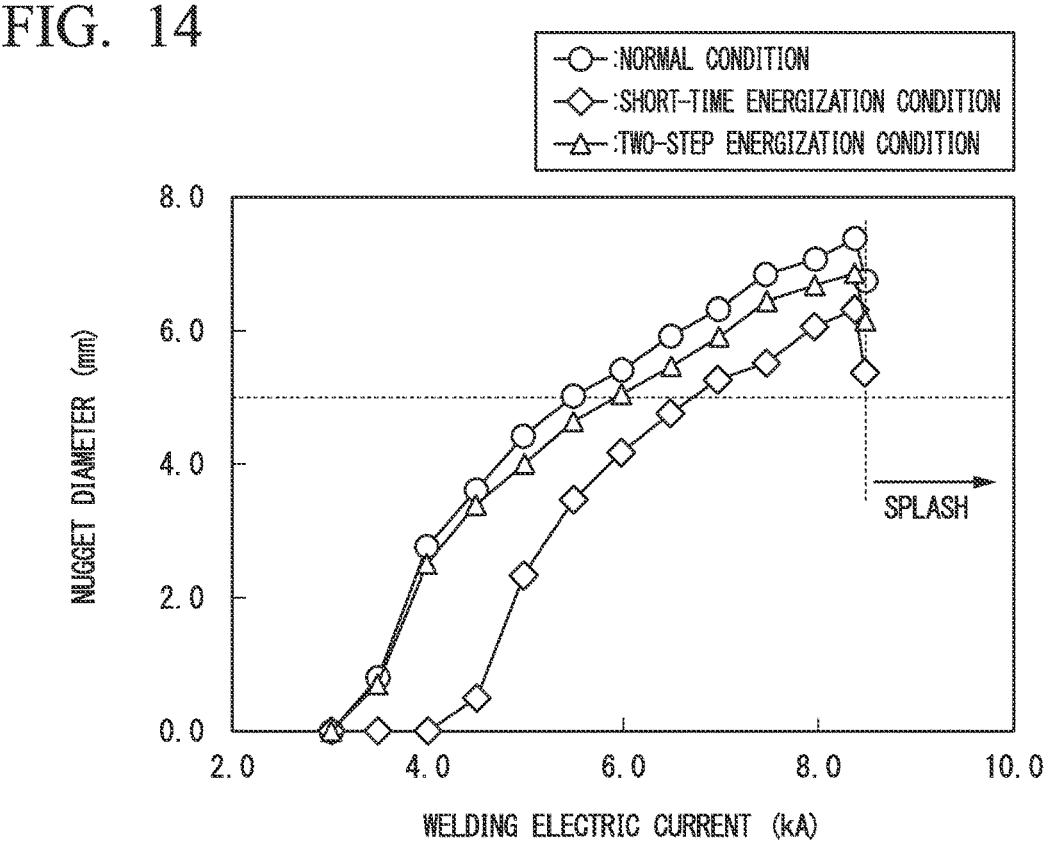
FIG. 14 is a graph showing behavior of nugget growth in the case where a short-time energization condition, a normal condition, and a two-step energization condition are applied to a hot-stamped member of an 1800 MPa class having a thickness of 1.6 mm.

FIG. 14 is a graph showing behavior of nugget growth in the case where the short-time energization condition (9×cyc), the normal condition (20×cyc), and a two-step energization condition (energization time in the first step: 11×cyc, welding electric current: 4 kA, and energization time in the second step: 9×cyc) are applied to a hot-stamped member of an 1800 MPa class having a thickness of 1.6 mm.

Figure 15:
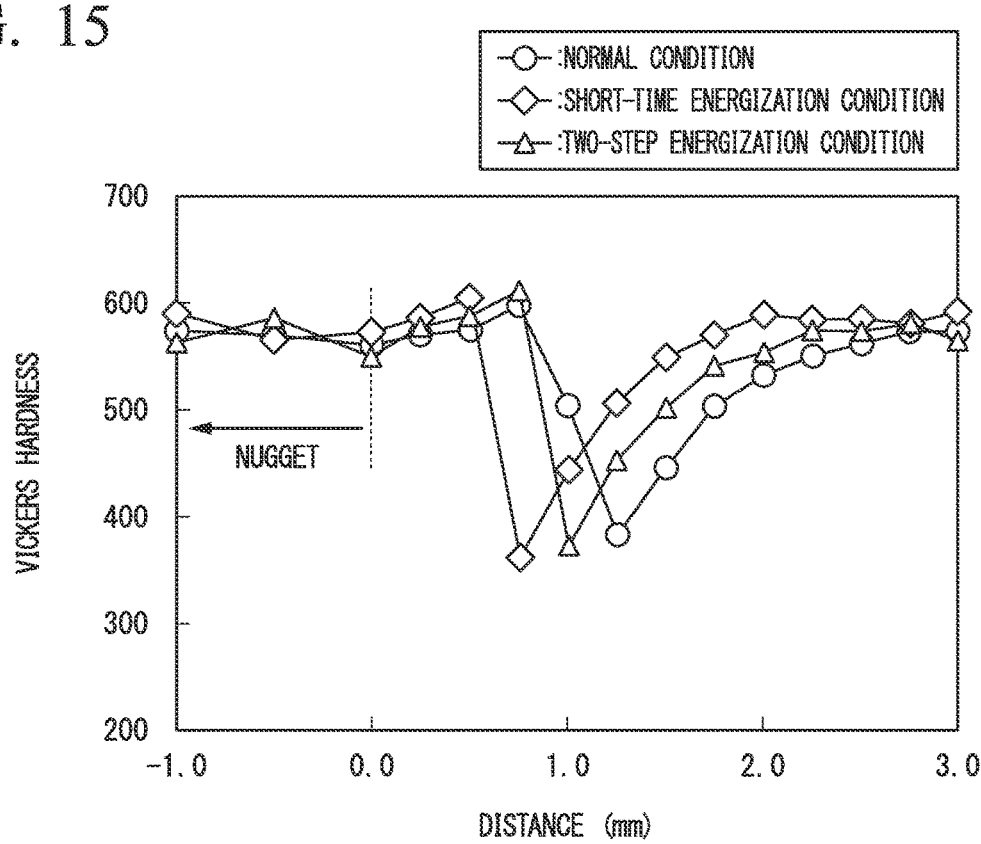
FIG. 15 is a graph showing distribution of hardness in a spot-welded portion formed under the conditions shown in FIG. 14.

Furthermore, FIG. 15 is a graph showing distribution of Vickers hardness based on distances from the nugget end of the spot-welded portion formed under the conditions shown in FIG. 14.

As shown in FIG. 14 and FIG. 15, by applying two-step energization including the preheat energization and the main energization, it is possible to bring the position of HAZ softening closer to the nugget end portion area 12B as compared with the conventional technique while maintaining the appropriate electric current range almost equivalent to that of the conventional technique.

Below, energization conditions for the preheat energization process will be described in detail.

In the preheat energization process, energization with preheat electric current I (kA) is applied to the overlapped portion in a manner such that energization time $T_1$ (second), a period of time cyc (second) for one cycle of energization, and a thickness t (mm) satisfy $$5t \times cyc \leq T_1 \leq (5t+8) \times cyc \quad \text{(Equation 3)}.$$

Then, in the case where the preheat energization process is performed, the nugget is formed by, after the preheat energization process, applying energization with welding electric current $I_0$ (kA), which is less than or equal to the splash occurring current, to the overlapped portion so as to satisfy $$5t \times cyc \leq T_2 \leq (5t+4) \times cyc \quad \text{Equation (4)},$$

where $T_2$ (second) is an energization time and cyc (second) is a period of time for one cycle of energization in the resistance spot welding.

Here, a relationship between the preheat electric current I (kA) and the welding electric current $I_0$ (kA) satisfies $$0.3 I_0 \leq I \leq 0.7 I_0 \quad \text{Equation (5)}.$$

In the preheat energization process described above, the energization time $T_1$ (second) is longer than or equal to 5 t×cyc, and the preheat electric current I (kA) is more than or equal to $0.3 I_0$, in other words, is more than or equal to 30% of the welding electric current $I_0$ in the resistance spot welding process for forming the nugget. Thus, the preheating effect is sufficient, and it is possible to secure a desired appropriate electric current range, which is preferable.

Furthermore, the energization time $T_1$ (second) is less than or equal to (5 t+4)×cyc, and the preheat electric current I (kA) is less than or equal to $0.7 I_0$, in other words, is less than or equal to 70% of the welding electric current $I_0$ in the resistance spot welding process for forming the nugget. Thus, it is possible to reduce the distance D from the nugget end 12E to the softest zone 14L in HAZ, which is preferable.

Then, in the resistance spot welding process performed after the preheat energization, the energization time $T_2$ is set to be not shorter than 5 t×cyc and not longer than (5 t+4)×cyc. Thus, it is possible to sufficiently form the nugget, and it is possible to make the distance D (mm) between the nugget end 12E and the softest zone 14L in HAZ to be not longer than $t^{0.2}$. This makes it possible to stably improve the peel strength in the spot-welded portion.

Furthermore, by adjusting the energization time such that the D (mm) is shorter than or equal to $0.75 \times (t^{0.2})$, it is possible to more reliably obtain the spot-welded portion whose fracture mode is the plug fracture, and it is possible to improve the peel strength.

By applying the tempering process described above (for example, tempering with the subsequent energization) to the thus obtained overlap-welded portion so that the nugget end portion area 12B is tempered, it is possible to form, between the central portion of the nugget 12 and the softest zone 14L, the tempered area formed by the tempered martensite having the Vickers hardness of 120% or less in the case where the Vickers hardness of the softest zone 14L is 100%.

Thus, it is possible to manufacture the overlap-welded member having the nugget diameter same as the conventional one, exhibiting excellent strength, and increased joint strength.

In order to obtain the effect as described above, it is necessary to adjust the short-time energization condition such that the nugget end 12E and the softest zone 14L in HAZ are brought closer to each other, and then, apply the tempering process to make the Vickers hardness of the tempered area to be not more than 120% of the Vickers hardness of the softest zone 14L. However, in order to obtain the effect in a more favorable manner, it is preferable to make the Vickers hardness of the tempered area to be not more than 115% of the Vickers hardness of the softest zone 14L, and it is more preferable to make the Vickers hardness of the tempered area to be not more than 110% of the Vickers hardness of the softest zone 14L.

It should be noted that the lower limit value of the Vickers hardness of the tempered area is not specified.

If the tensile strength of the base material is stronger than or equal to a 980 MPa class, the interface fracture or the partial plug fracture is more likely to occur in the overlap-welded member, and the joint strength tends to decrease.

This embodiment is effective to the steel sheet member having the HAZ softening made as a result of spot welding. However, it is preferable to apply this embodiment to a high-tensile steel sheet having the base metal with a tensile strength of a 980 MPa class or higher.

In particular, in the case of the hot-stamped member, the base metal is full martensite. Thus, the amount of softening of HAZ is large, and the effect obtained by this embodiment is significant.

Furthermore, as for the overlap-welded member according to this embodiment, there is no limitation on the thickness of, the type (for example, DP, TRIP, and so on) of, and the existence or absence of plating of each steel sheet member in the overlapped portion formed by two or more steel sheet members.

Furthermore, in Example described later, although description will be made of a sheet set obtained by overlapping two steel sheets with the same type, application is not limited to this sheet set. The effect can be obtained in the case of a sheet set with different materials, or a sheet set with three or more sheets.

Figure 16:
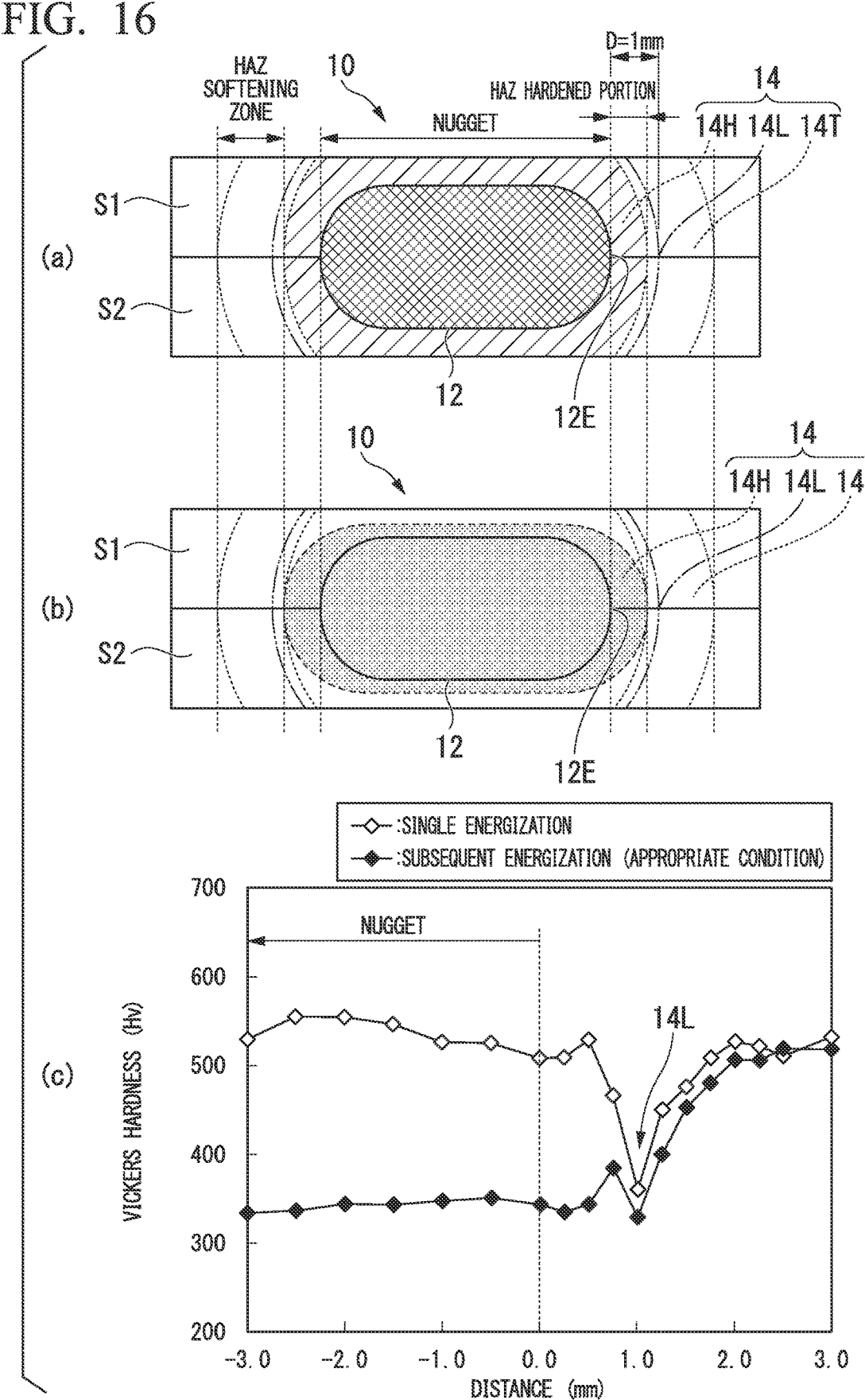
FIG. 16 is a diagram schematically illustrating changes of HAZ in spot-welded portions after single energization and after subsequent energization in the case where a short-time energization condition according to an embodiment of the present invention is applied to a hot-stamped member.

FIG. 16 is a diagram illustrating a schematic configuration of the spot-welded portion 10 formed with the energization condition according to this embodiment in the case where hot-stamped members are used as the steel sheet members S1 and S2. More specifically, (a) in FIG. 16 is a sectional view illustrating a spot-welded portion after a short-time energization is applied, and (b) in FIG. 16 is a sectional view illustrating a spot-welded portion after a subsequent energization is applied. (c) in FIG. 16 is a graph showing distribution of Vickers hardness after the single energization and after the subsequent energization.

Figure 17:
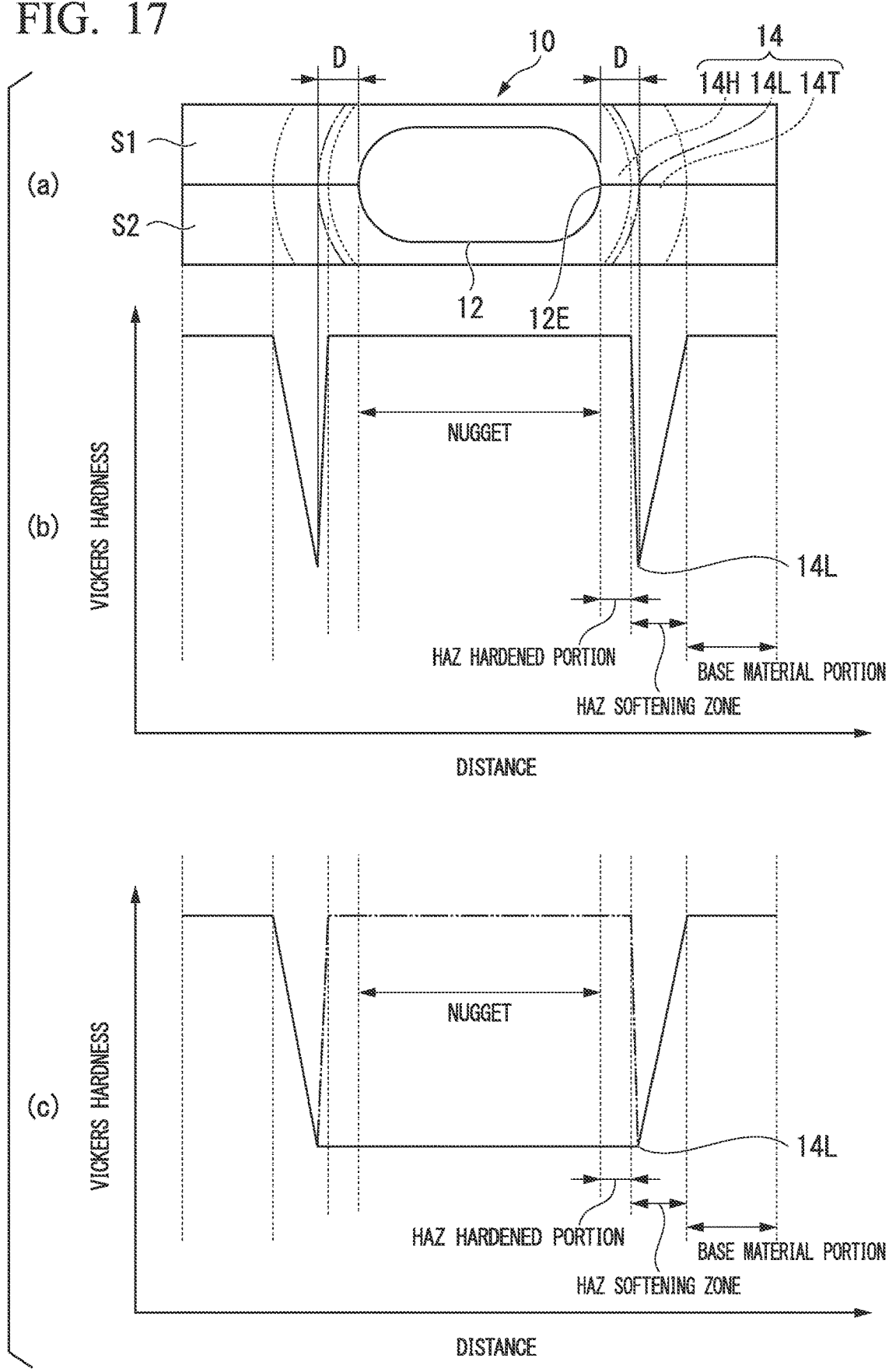
FIG. 17 is a diagram schematically illustrating changes in Vickers hardness in spot-welded portions after single energization and after subsequent energization in the case where a short-time energization condition according to an embodiment of the present invention is applied to a hot-stamped member.

Furthermore, FIG. 17 is a diagram schematically illustrating changes in Vickers hardness in the spot-welded portion after the single energization and after the subsequent energization.

By applying the short-time energization, the distance D between the nugget end 12E and the softest zone 14L in HAZ is reduced to approximately 1 mm as illustrated in (a) in FIG. 16.

Since the distance D between the nugget end 12E and the softest zone 14L in HAZ through energization under a conventional normal condition is approximately 1.5 mm, the distance is significantly reduced as compared with the conventional one.

As a result, it is possible to alleviate the stress concentration in the vicinity of the nugget end 12E.

Moreover, by further applying the subsequent energization, it is possible to sufficiently temper the HAZ hardened portion 14H in the dot-hatched area illustrated in (b) in FIG. 16.

As described above, in the case where the spot-welded portion 10 is formed by applying the energization condition according to the present invention to the hot-stamped members S1 and S2, the Vickers hardness of the HAZ hardened portion 14H is almost equal to that of the nugget 12 by applying the short-time single energization as illustrated in (a) and (b) in FIG. 17.

Furthermore, by applying the subsequent energization, the nugget 12 and the HAZ hardened portion 14H are sufficiently tempered as illustrated in (c) in FIG. 17, and the hardness in terms of Vickers hardness between the softest zone 14L in HAZ and the nugget end 12E is similar to that of the softest zone 14L in HAZ, or the maximum value of the hardness thereof is approximately 115% of the softest zone 14L in HAZ. Thus, the stress in the nugget end portion area 12B is sufficiently alleviated.

As a result, it is possible to improve the peel strength of the spot-welded portion 10 of the hot-stamped members. Note that the entire nugget 12 does not necessarily have to be tempered, provided that the nugget end portion area 12B is tempered.

As described above, by tempering the HAZ hardened portion 14H, the maximum hardness in terms of Vickers hardness between the nugget 12 and the softest zone 14L in HAZ is made fall in a range of less than or equal to approximately 120% of the hardness of the softest zone 14L in HAZ as illustrated in (c) in FIG. 16.

As a result, the toughness of the nugget 12 and the HAZ hardened portion is improved, whereby it is possible to improve the peel strength.

It should be noted that, even if the entire nugget 12 is not tempered, the joint strength improves, provided that the maximum Vickers hardness between the nugget end 12E and the softest zone 14L in HAZ is less than or equal to 120% of the Vickers hardness of the softest zone 14L in HAZ, preferably is less than or equal to 115%, more preferably is less than or equal to 110%.

It should be noted that it is preferable that: the short-time energization condition be adjusted; the nugget end and the softest zone in HAZ be brought closer to each other; and the maximum value in terms of Vickers hardness between the central portion of the nugget 12 and the softest zone 14L in HAZ after the subsequent energization is applied be made to be 115% relative to the softest zone 14L in HAZ.

Furthermore, it is more preferable that: the short-time energization condition be adjusted; the nugget end and the softest zone in HAZ be brought close to each other; and the maximum value in terms of Vickers hardness between the nugget and the softest zone in HAZ after the subsequent energization is applied be made to be 110% relative to the softest zone 14L in HAZ.

Figure 18:
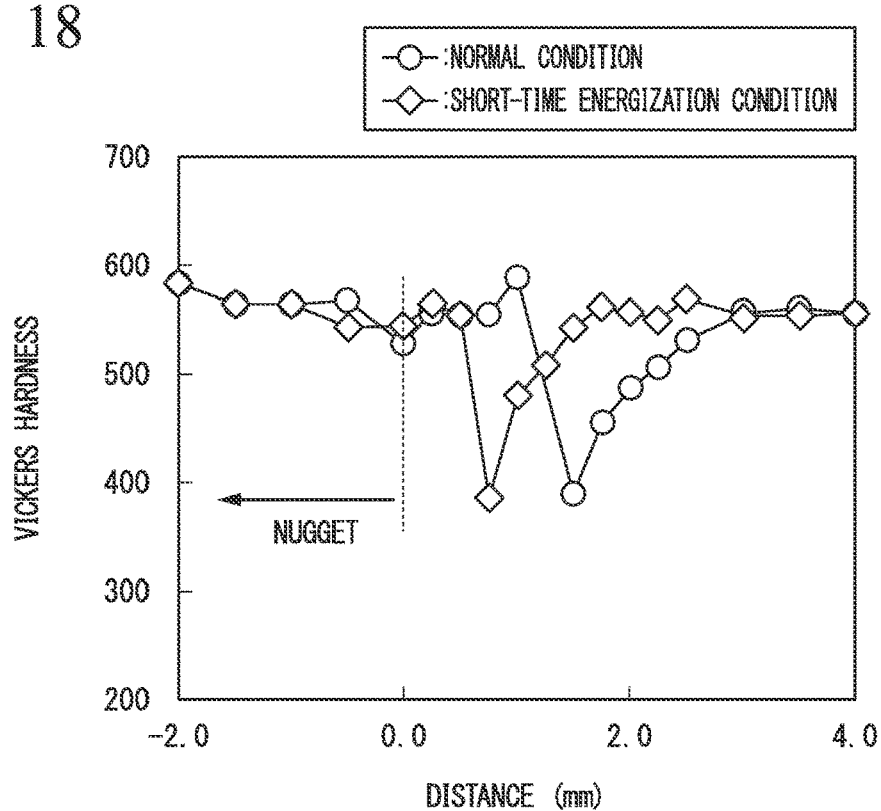
FIG. 18 is a graph showing distribution of hardness in spot-welded portions after single energization in the case where a short-time energization condition according to an embodiment of the present invention and a normal energization condition are applied to a hot-stamped member of an 1800 MPa class having a thickness of 1.8 mm.

FIG. 18 is a graph showing distribution of hardness in the spot-welded portion through single energization in the case where the short-time energization condition according to this embodiment and a normal energization condition are applied to a hot-stamped member of an 1800 MPa class having a thickness of 1.8 mm.

Figure 19:
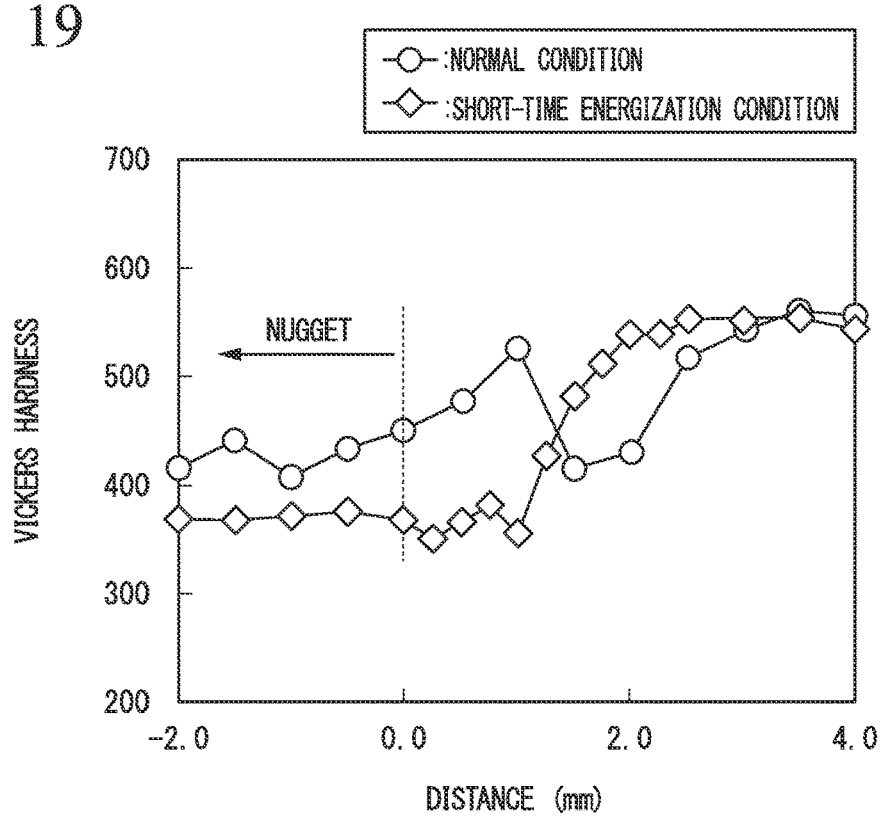
FIG. 19 is a graph showing distribution of hardness in spot-welded portions after subsequent energization in the case where a short-time energization condition according to an embodiment of the present invention and a normal energization condition are applied to a hot-stamped member of an 1800 MPa having a thickness of 1.8 mm.

Furthermore, FIG. 19 is a graph showing distribution of hardness in the spot-welded portion after the subsequent energization is applied in the case where the short-time energization condition according to this embodiment and a normal energization condition are applied to a hot-stamped member of an 1800 MPa class having a thickness of 1.8 mm.

In FIG. 18, the "blank diamonds" represent the distribution of hardness in a spot-welded portion in the case where the spot-welded portion is formed with a main energization employing a short-time energization condition with an energization time being 9×cyc (second). Furthermore, the "blank circles" represent the distribution of hardness in a spot-welded portion in the case where the spot-welded portion is formed with a main energization employing a normal condition with an energization time being 22×cyc (second).

In FIG. 19, the "blank diamonds" represent the distribution of hardness in a spot-welded portion in the case where the spot-welded portion is formed with a main energization employing a short-time energization condition with an energization time being 9×cyc (second), and then, tempering is performed through a subsequent energization, and the "blank circles" represent the distribution of hardness in a spot-welded portion in the case where the spot-welded portion is formed with a main energization employing a normal condition with an energization time being 22×cyc (second), and then, tempering is performed through a subsequent energization.

First, as shown in the graph in FIG. 18, with the short-time energization condition indicated by the "blank diamonds," the distance from the nugget end to the softest zone in HAZ is reduced, as compared with that of the normal condition indicated by the "blank circles."

As shown in the graph in FIG. 19, in the case where the subsequent energization is applied, in the spot-welded portion formed by applying the normal condition at the time of the main energization, hard portions exist between the nugget and the softest zone (at a position approximately 1 mm from the end portion area of the nugget) because the softest zone in HAZ formed at the time of the main energization is far from the nugget end portion.

On the other hand, in the spot-welded portion formed by applying the short-time energization condition at the time of the main energization, the softest zone in HAZ formed at the time of the main energization is brought close to the end portion area of the nugget, and hence, it is possible to make the Vickers hardness of the nugget and the HAZ extending from the base metal to the nugget end portion area 12B (including the nugget end portion area 12B) to be 120% or lower of the hardness of the softest zone in HAZ.

In other words, in the case where the subsequent energization is applied, the strain concentration in the vicinity of the nugget end 12E can be alleviated if the distance from the nugget end 12E to the softest zone in HAZ formed at the time of the main energization is reduced.

As described above, reducing the energization time for forming the nugget 12 is effective from the viewpoint of bringing the position of the HAZ softening closer to the end portion area of the nugget to improve the joint strength.

Figure 20:
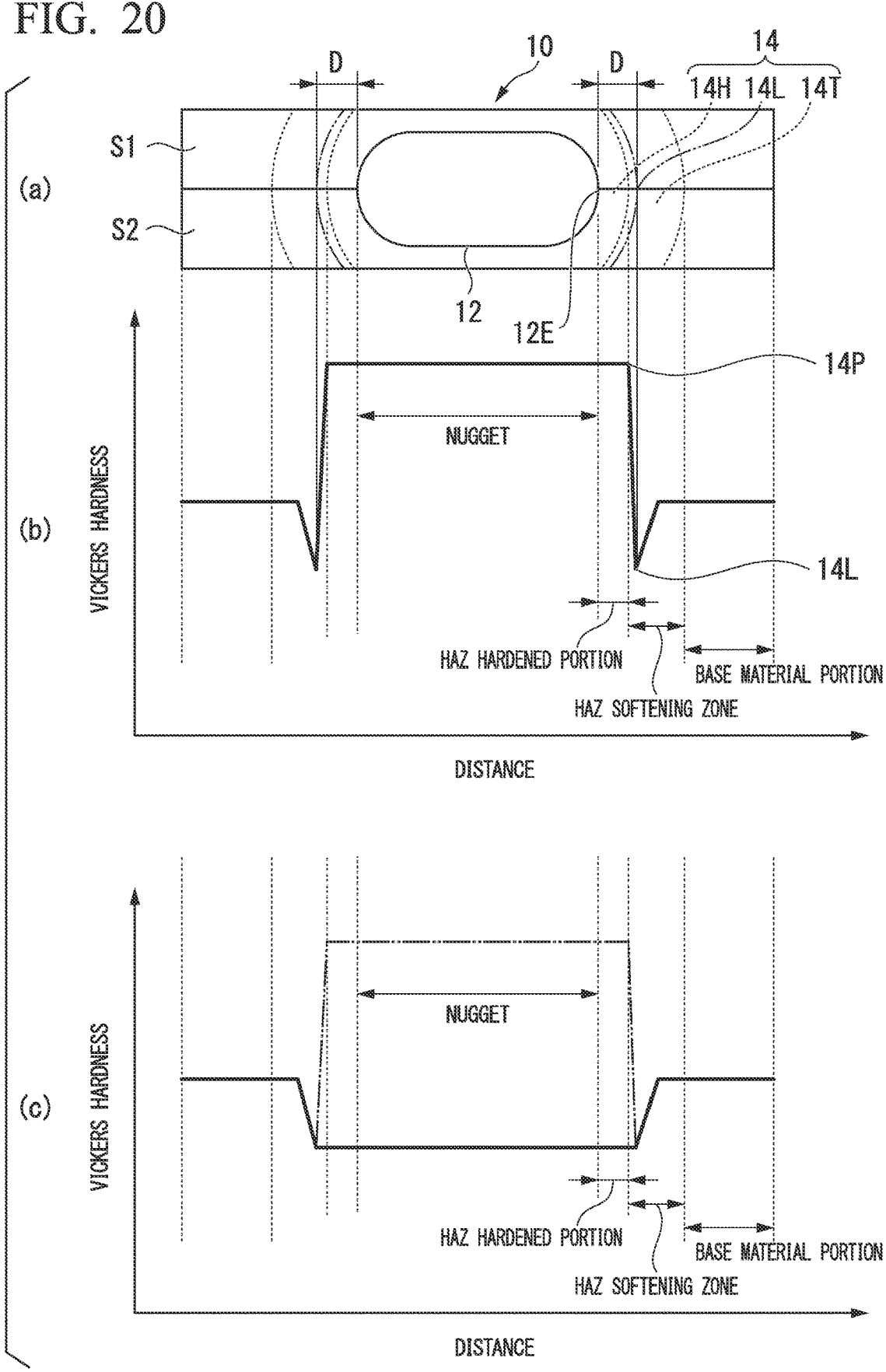
FIG. 20 is a diagram schematically illustrating changes of distribution of hardness in a spot-welded portion obtained by forming the spot-welded portion under a short-time energization condition according to an embodiment of the present invention and a normal energization condition, and then, applying subsequent energization.

FIG. 20 is a diagram schematically illustrating changes in HAZ of the spot-welded portion after the single energization and the subsequent energization in the case where the short-time energization condition according to this embodiment is applied to a DP member or a TRIP member.

(a) in FIG. 20 is a sectional view illustrating a spot-welded portion.

As illustrated in (b) in FIG. 20, in the case where the DP members or TRIP members are used as steel sheet members S1 and S2, the HAZ hardened portion 14H has the Vickers hardness almost equal to the nugget 12 in a state where the short-time single energization is applied.

In this case, in the nugget 12 and the HAZ hardened portion 14H, the distribution of hardness is different from the hot-stamped member illustrated in FIG. 17 in that they are significantly harder than the base material of the DP member or TRIP member.

Furthermore, as illustrated in (c) in FIG. 20, by applying the subsequent energization, the nugget 12 and the HAZ hardened portion 14H are sufficiently tempered, and the hardness in terms of Vickers hardness between the softest zone 14L in HAZ and the nugget end 12E becomes approximately 115% of the softest zone 14L in HAZ, whereby the stress in the nugget end portion area 12B is sufficiently alleviated.

As a result, it is possible to improve the peel strength in the spot-welded portion 10 in the case of the DP member or TRIP member.

It should be noted that the entire nugget 12 does not have to be necessarily tempered, provided that the nugget end portion area 12B is tempered.

It should be noted that the long dashed double-short dashed line illustrated in (c) in FIG. 20 indicates the distribution of hardness before the subsequent energization is applied.

It should be noted that, in the embodiment described above, descriptions have been made of a case where the HAZ hardened portion 14H is tempered through subsequent energization. However, the nugget and the HAZ hardened portion may be tempered, for example, by laser emission after the spot-welded portion 10 is formed through the short-time single energization.

EXAMPLES

Below, it is confirmed that bringing the softest zone in HAZ close to the nugget end portion is effective to improve the joint strength in the peeling direction.

By reducing the energization time, it is possible to bring the softest zone in HAZ close to the nugget end portion. However, from the viewpoint of formation of the nugget, if the energization time is reduced, the appropriate electric current range (in general, the electric current range from an electric current value with which the nugget diameter of $4\sqrt{t}$ can be obtained, to occurrence of splash) becomes narrow.

Then, a study was made to achieve both controlling the position of HAZ softening and obtaining the appropriate electric current range, using a two-step energization in which steel sheets are heated through preliminary energization with an early-stage of energization being low electric current, and then, a nugget is expanded with a short-time high electric current.

Investigations were made on a hot-stamped member of an 1800 MPa class having a thickness of 1.6 mm under welding conditions shown in Table 1. Condition (1) corresponds to a short-time single energization condition, (2) corresponds to a conventional single energization condition, and (3) corresponds to a two-step energization condition.

As can be understood from the behavior of nugget formation illustrated in FIG. 14 and the distribution of hardness in the spot-welded portion illustrated in FIG. 15, with the two-step energization, it is possible to obtain an appropriate electric current range equivalent to that with the conventional single energization and bring the softest zone in HAZ close to the nugget end portion.

TABLE 1

|  | Electrode | Compression force (kN) | First energization Time (cyc) | First energization Electric current (kA) | Second energization Time (cyc) | Second energization Electric current (kA) | Retention time (cyc) |
|---|---|---|---|---|---|---|---|
| Condition (1) | Cu—1% Cr | 3.92 | 9 | 3.0-8.5 | — | — | 10 |
| Condition (2) | Dome type |  | 20 | 3.0-8.5 | — | — |  |
| Condition (3) | Diameter of top end: 6 mm |  | 11 | 4.0 | 9 | 3.0-8.5 |  |

The welding electric current was adjusted so that the nugget diameter of $4\sqrt{t}$ (mm) can be obtained. As for the subsequent energization condition, a condition effective in improving the peel strength, in other words, a condition with which the end portion area of a nugget can be softened was selected.

By using a steel sheet of a 980 MPa class, hot-stamped members of a 1500 MPa class, and hot-stamped members of an 1800 MPa class, each of which has a thickness in a range of 1.6 mm to 2.0 mm, the cross-tension strength and the L-shape tension strength were investigated. Table 2 shows welding conditions used. $I_0$ represents an electric current value in the main energization process.

TABLE 2

| Condition | Electrode | Compression force (kN) | Preliminary energization process Time (cyc) | Preliminary energization process Electric current (kA) | Main energization process Time (cyc) | Suspension time (cyc) | Subsequent energization process Time (cyc) | Subsequent energization process Electric current (kA) | Retaining time (cyc) |
|---|---|---|---|---|---|---|---|---|---|
| A | Cu—1% Cr | 3.92 | — | — | 10t + 4 | — | — | — | 10 |
| B | Dome type |  | — | — | 10t + 4 | 60 | 20-50 | $0.6I_0$-$0.8I_0$ |  |
| A1 | Diameter of |  | — | — | 5t | — | — | — |  |
| A2 | top end: 6 |  | 5t + 3 | $0.5I_0$-$0.7I_0$ | 5t | — | — | — |  |
| B1 | mm |  | — | — | 5t | 60 | 20-50 | $0.6I_0$-$0.8I_0$ |  |
| B2 |  |  | 5t + 3 | $0.5I_0$-$0.7I_0$ | 5t | 60 | 20-50 | $0.6I_0$-$0.8I_0$ |  |

Condition a corresponds to a conventional single energization condition, and condition b corresponds to a conventional subsequent energization condition. Condition A1 corresponds to a short-time single energization condition, and condition A2 corresponds to a two-step energization condition. As for conditions B1 and B2, subsequent energization was performed for the conditions A1 and A2, respectively. In each of the welding conditions, welding electric current was adjusted so that the nugget diameter of 4 √t can be obtained.

Figure 21:
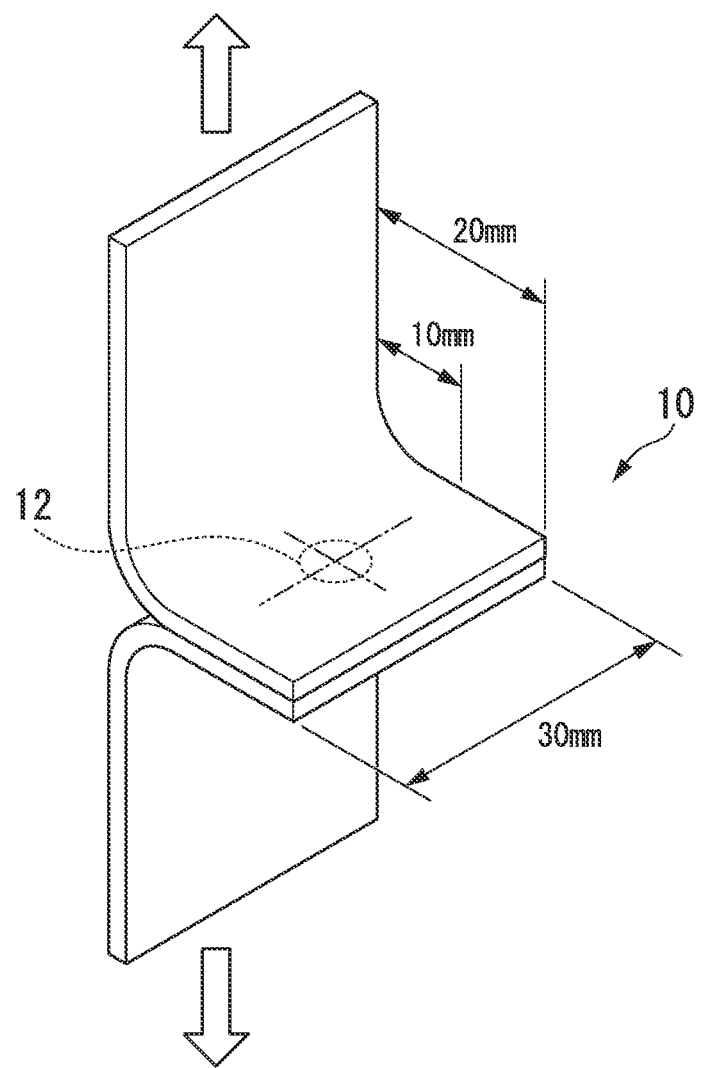
FIG. 21 is a perspective view illustrating an L-shaped test.

As for the joint strength, measurement was performed according to cross-tension test based on JIS Z3137 (1999) in the case of a cross joint, and measurement was performed with a test illustrated by a schematic diagram of FIG. 21 in the case of an L-shaped joint.

More specifically, in L-shaped tensile testing, bent portions of two test pieces each formed by bending a steel sheet into an L shape were overlapped with each other as illustrated in FIG. 21, and were joined by forming a spot-welded portion 10 having a nugget 12 formed in the overlapped portion through resistance spot welding; then, the overlapped portion was pulled in a direction of peeling; and a strength of the spot-welded portion 10 until fracture was measured as the joint strength.

First, by using a DP steel sheet of a 980 MPa class and hot-stamped members of a 1500 MPa class and an 1800 MPa class, each of which has a thickness in a range of 1.6 mm to 2.0 mm, the peel strength of overlap-welded members and fracture mode thereof were investigated. Table 4 shows welding conditions. t is the thickness of the steel sheet, and $I_0$ was adjusted so that the nugget diameter 4 √t (mm) can be obtained in each of the sheet sets. Note that the distance D is a distance from the nugget end portion area to the softest zone in HAZ.

Table 3 shows effects of improvement of joint strength under the conditions A1 and A2. Table 3 is a table explaining Example related to the single energization.

As shown in Table 3, with any steel type and any thickness, the spot-welded portions formed through the short-time energization with the condition A1 and the preliminary energization and the short-time energization with the A2 improve the joint strength, as compared with the conventional single energization with the condition a. It can be considered that this is because of the effect in which the stress concentration on the nugget end portion is alleviated by bringing the position of HAZ softening closer to the nugget end portion.

Furthermore, as for the L-shaped tensile strength concerning the hot-stamped member of an 1800 MPa class, by applying the short-time energization with the condition A1, the joint strength improves by approximately 25%, as compared with the case of the condition a.

Furthermore, by using the DP steel sheet of a 980 MPa class, and hot-stamped members of a 1500 MPa class and an 1800 MPa class, each of which has a thickness in a range of 1.6 mm to 2.0 mm, the peel strength of overlap-welded members and fracture mode thereof were investigated. Table 4 shows welding conditions. t is the thickness of the steel sheet, and $I_0$ was adjusted so that the nugget diameter 4 √t (mm) can be obtained in each of the sheet sets. Note that the distance D is a distance from the nugget end portion area to the softest zone in HAZ.

Table 4 shows effects of improvement of joint strength under the conditions B1 and B2. Table 4 is a table explaining Example in the case where the subsequent energization is applied.

TABLE 3

| Steel type | Joint shape | Thickness t (mm) | $t^{0.2}$ (mm) | Welding condition | Distance D (mm) | Joint strength (kN) | Fracture mode | Note |
|---|---|---|---|---|---|---|---|---|
| 980 MPa | Cross | 2.0 | 1.15 | a | 1.5 | 9.8 | Partial plug fracture | Comparative Example |
| | | | | A1 | 1.0 | 12.5 | Partial plug fracture | Example of present invention |
| 1500 MPa | | 1.6 | 1.10 | a | 1.3 | 5.6 | Partial plug fracture | Comparative Example |
| | | | | A1 | 0.8 | 8.2 | Plug fracture | Example of present invention |
| | | | | A2 | 1.0 | 8.3 | Plug fracture | Example of present invention |
| | | 2.0 | 1.15 | a | 1.5 | 7.2 | Interface fracture | Comparative Example |
| | | | | A1 | 1.0 | 8.6 | Partial plug fracture | Example of present invention |
| 1800 MPa | | 1.6 | 1.10 | a | 1.3 | 3.2 | Partial plug fracture | Comparative Example |
| | | | | A2 | 1.0 | 3.9 | Partial plug fracture | Example of present invention |
| | | 2.0 | 1.15 | a | 1.5 | 4.8 | Interface fracture | Comparative Example |
| | | | | A1 | 1.0 | 5.5 | Interface fracture | Example of present invention |
| 1800 MPa | L shape | 1.8 | 1.12 | a | 1.3 | 1.2 | Interface fracture | Comparative Example |
| | | | | A1 | 0.8 | 1.5 | Interface fracture | Example of present invention |

TABLE 4

| Steel type | Joint shape | Thickness t (mm) | $t^{0.2}$ (mm) | Welding condition | Distance D (mm) | Joint strength (kN) | Fracture mode | Note |
|---|---|---|---|---|---|---|---|---|
| 980 MPa | Cross | 2.0 | 1.15 | b | 1.5 | 15.9 | Plug fracture | Comparative Example |
| | | | | B1 | 1.0 | 18.1 | Plug fracture | Example of present invention |
| 1500 MPa | | 2.0 | 1.15 | b | 1.5 | 14.5 | Partial plug fracture | Comparative Example |
| | | | | B1 | 1.0 | 18.5 | Plug fracture | Example of present invention |
| 1800 MPa | | 1.6 | 1.10 | b | 1.5 | 5.7 | Partial plug fracture | Comparative Example |
| | | | | B1 | 1.0 | 8.7 | Plug fracture | Example of present invention |
| | | | | B2 | 1.0 | 8.7 | Plug fracture | Example of present invention |
| | | 2.0 | 1.15 | b | 1.5 | 5.2 | Interface fracture | Comparative Example |
| | | | | B1 | 1.0 | 7.3 | Partial plug fracture | Example of present invention |
| 1800 MPa | L shape | 1.8 | 1.12 | b | 1.5 | 2.2 | Interface fracture | Comparative Example |
| | | | | B1 | 1.0 | 4.7 | Plug fracture | Example of present invention |

As shown in Table 4, with any steel type and any thickness, the joint strength improves, as compared with the conventional single energization condition with the condition a. It can be considered that this is not only because the nugget end portion is tempered and the toughness improves as with the conventional subsequent energization technique, but also because of the effect in which the distribution of hardness appropriate for alleviating the stress concentration on the nugget end portion can be obtained.

Furthermore, as for the L-shaped tensile strength concerning the hot-stamped member of an 1800 MPa class, by applying the short-time energization and the subsequent energization with the condition B1, the fracture mode changes from the interface fracture to the plug fracture, and the joint strength improves by approximately 114%, as compared with the case of the condition b.

INDUSTRIAL APPLICABILITY

According to the present invention, it is possible to improve the peel strength of a spot-welded portion of an overlap-welded member in which plural steel sheet members, at least one of which contains martensite, are joined at an overlapped portion, and the overlapped portion is joined at the spot-welded portion. Therefore, the present invention is industrially applicable.

BRIEF DESCRIPTION OF THE REFERENCE SYMBOLS

10 spot-welded portion
12 nugget
12B nugget end portion area
12C meeting portion
12E nugget end
14 HAZ
14H HAZ hardened portion
14T HAZ softening zone
14L the softest zone in HAZ

The invention claimed is:

1. A method of welding an overlapped portion, including a resistance spot welding process in which a spot-welded portion is formed through resistance spot welding in an overlapped portion including a plurality of steel sheet members, the spot-welded portion including:
   a nugget;
   a heat-affected zone formed in the vicinity of the nugget; and
   a softest zone having the lowest Vickers hardness in the heat-affected zone,
   wherein the heat-affected zone comprises a softening zone and a hardened portion,
   the hardened portion being sandwiched between the nugget and the softening zone, and
   the softest zone in the softening zone being at an inner peripheral edge of the softening zone, and
   a tempering process of forming, in all areas between a central portion of the nugget and the softest zone, a tempered area made out of tempered martensite, the tempered area in which the maximum Vickers hardness is not more than 120% in a case where Vickers hardness of the softest zone is 100%.

2. The method of welding an overlapped portion according to claim 1, wherein
   in the resistance spot welding step, energization is performed so as to satisfy Equation (2) described below, where:
   T (second) is an energization time in the resistance spot welding;
   if there is only one steel sheet member having the highest tensile strength of the plurality of steel sheet members, t (mm) is a thickness of this steel sheet member, whereas, if there are a plurality of steel sheet members having the highest tensile strength, t (mm) is a thickness of a steel sheet member having the thinnest thickness of these steel sheet members; and
   cyc (second) is a period of time for one cycle of energization in the resistance spot welding, $$5t \times cyc \leq T \leq (5t+4) \times cyc \qquad \text{Equation (2)}.$$

3. The method of welding an overlapped portion according to claim 1, wherein the method further includes, before the resistance spot welding step, applying a preheat electric current I (kA) to the overlapped portion in a state where an energization time $T_1$ (second), a period of time cyc (second) for one cycle of energization, and a thickness t (mm) satisfy Equation (3) described below;

as for the thickness t (mm), if there is only one steel sheet member having the highest tensile strength of the plurality of steel sheet members, a thickness of this steel sheet member is used, whereas, if there are a plurality of steel sheet members having the highest tensile strength, a thickness of a steel sheet member having the thinnest thickness of these steel sheet members is used;

in the resistance spot welding step, a welding electric current $I_0$ (kA) not more than a splash occurring current is applied to the overlapped portion in a state where Equation (4) described below is satisfied, where $T_2$ (second) is an energization time, and cyc (second) is a period of time for one cycle of energization in the resistance spot welding; and the preheat electric current I (kA) and the welding electric current $I_0$ (kA) satisfy Equation (5) described below, $$5t \times cyc \leq T_1 \leq (5t+8) \times cyc \qquad \text{Equation (3).}$$

$$5t \times cyc \leq T_2 \leq (5t+4) \times cyc \qquad \text{Equation (4),}$$

$$0.3I_0 \leq I \leq 0.7I_0 \qquad \text{Equation (5).}$$

4. The method of welding an overlapped portion according to claim 1, wherein in the resistance spot welding step, the resistance spot welding is performed so as to satisfy Equation (6) described below, where D (mm) is a distance from a melting boundary portion of the nugget to the softest zone, and if there is only one steel sheet member having the highest tensile strength of the plurality of steel sheet members, t (mm) is a thickness of this steel sheet member, whereas, if there are a plurality of steel sheet members having the highest tensile strength, t (mm) is a thickness of a steel sheet member having the thinnest thickness of these steel sheet members, and the tempering process is a subsequent energization process in which the tempered area is formed through subsequent energization, $$D \leq t^{0.2} \qquad \text{Equation (6).}$$

5. The method of welding an overlapped portion according to claim 4, wherein in the resistance spot welding step, energization is applied so as to satisfy Equation (7) described below, where T (second) is an energization time in the resistance spot welding, and cyc (second) is a period of time for one cycle of energization in the resistance spot welding, $$5t \times cyc \leq T \leq (5t+4) \times cyc \qquad \text{Equation (7).}$$

6. The method of welding an overlapped portion according to claim 4, wherein the method further includes, before the resistance spot welding step:

applying a preheat electric current I (kA) to the overlapped portion in a state where an energization time $T_1$ (second), a period of time cyc (second) for one cycle of energization, and the thickness t (mm) satisfy Equation (8) described below;

in the resistance spot welding step, a welding electric current $I_0$ (kA) not more than a splash occurring current is applied to the overlapped portion in a state where Equation (9) described below is satisfied, where $T_2$ (second) is an energization time, and cyc (second) is a period of time for one cycle of energization; and the preheat electric current I (kA) and the welding electric current $I_0$ (kA) satisfy Equation (10) described below, $$5t \times cyc \leq T_1 \leq (5t+8) \times cyc \qquad \text{Equation (8),}$$

$$5t \times cyc \leq T_2 \leq (5t+4) \times cyc \qquad \text{Equation (9),}$$

$$0.3I_0 \leq I \leq 0.7I_0 \qquad \text{Equation (10).}$$

7. The method of welding an overlapped portion according to claim 1, wherein the plurality of steel sheet members includes a hot-stamped member having a tensile strength of 1500 MPa or higher.

* * * * *